United States Patent [19]

Kato et al.

[11] Patent Number: 5,694,158
[45] Date of Patent: Dec. 2, 1997

[54] IMAGE FORMING APPARATUS WITH IMAGE CARRIER AND SHEET FEED DRIVE CONTROL

[75] Inventors: Junichi Kato, Sagamihara; Masaki Ojima, Yokohama; Takahiro Inoue, Yokohama; Masahiro Goto, Yokohama; Koichi Hiroshima, Yokohama; Shinichi Tsukida, Okegawa; Manabu Takano, Machida; Hiromichi Yamada, Yokohama; Koichi Suwa, Yokohama; Yoji Serizawa, Yokohama; Akio Noguchi, Ebina; Yukihide Ushio, Tokyo; Shimpei Matsuo, Tokyo; Seiji Uchiyama, Tokyo; Makoto Takeuchi, Yokohama; Kazuro Yamada, Machida, all of Japan

[73] Assignee: Canon Kabushiki Kaisha, Tokyo, Japan

[21] Appl. No.: 409,937

[22] Filed: Mar. 23, 1995

Related U.S. Application Data

[63] Continuation of Ser. No. 701,505, May 16, 1991, abandoned.

[30] Foreign Application Priority Data

May 17, 1990 [JP] Japan .................................. 2-128191
Jul. 19, 1990 [JP] Japan .................................. 2-192270

[51] Int. Cl.$^6$ ................................................ G01D 15/14
[52] U.S. Cl. ................................ 347/139; 347/262
[58] Field of Search .............................. 355/210, 233, 355/316, 317, 211, 200, 308, 309; 358/300, 302; 346/107 R, 108, 160; 347/248, 249, 250, 262, 264, 139, 153

[56] References Cited

U.S. PATENT DOCUMENTS

| | | | |
|---|---|---|---|
| 4,647,946 | 3/1987 | Inuyama | 346/108 |
| 4,809,025 | 2/1989 | Noguchi | 346/154 |
| 4,866,595 | 9/1989 | Shimizu | 346/154 |
| 4,894,669 | 1/1990 | Sugiura et al. | 346/160 |
| 4,914,456 | 4/1990 | Kawano et al. | 346/154 |
| 4,922,272 | 5/1990 | Wakamatsu et al. | 346/160 |
| 4,931,834 | 6/1990 | Suga | 355/200 |
| 4,933,772 | 6/1990 | Ikenoue et al. | 358/300 |
| 4,985,736 | 1/1991 | Kawano et al. | 355/309 X |

FOREIGN PATENT DOCUMENTS

| | | |
|---|---|---|
| 183166 | 6/1986 | European Pat. Off. . |
| 361857 | 4/1990 | European Pat. Off. . |
| 410817 | 1/1991 | European Pat. Off. . |
| 0113253 | 6/1985 | Japan . |
| 0085566 | 4/1987 | Japan . |
| 0187361 | 8/1987 | Japan . |
| 0093361 | 4/1989 | Japan . |
| 0284876 | 11/1989 | Japan . |
| 0141770 | 5/1990 | Japan . |

*Primary Examiner*—Robert Beatty
*Attorney, Agent, or Firm*—Fitzpatrick, Cella, Harper & Scinto

[57] ABSTRACT

An image forming apparatus which converts character or pattern information into bit map information (pixel information) and forms an image based thereon. The image forming apparatus includes a light-beam generator for generating a modulated light beam, a light-beam deflector for scanning an image carrier, a device for feeding a sheet to registration rollers and a driver for driving the image carrier. A time period is provided to operate the light-beam deflector and the feeding device before the driver starts to drive the image carrier to form an image.

20 Claims, 22 Drawing Sheets

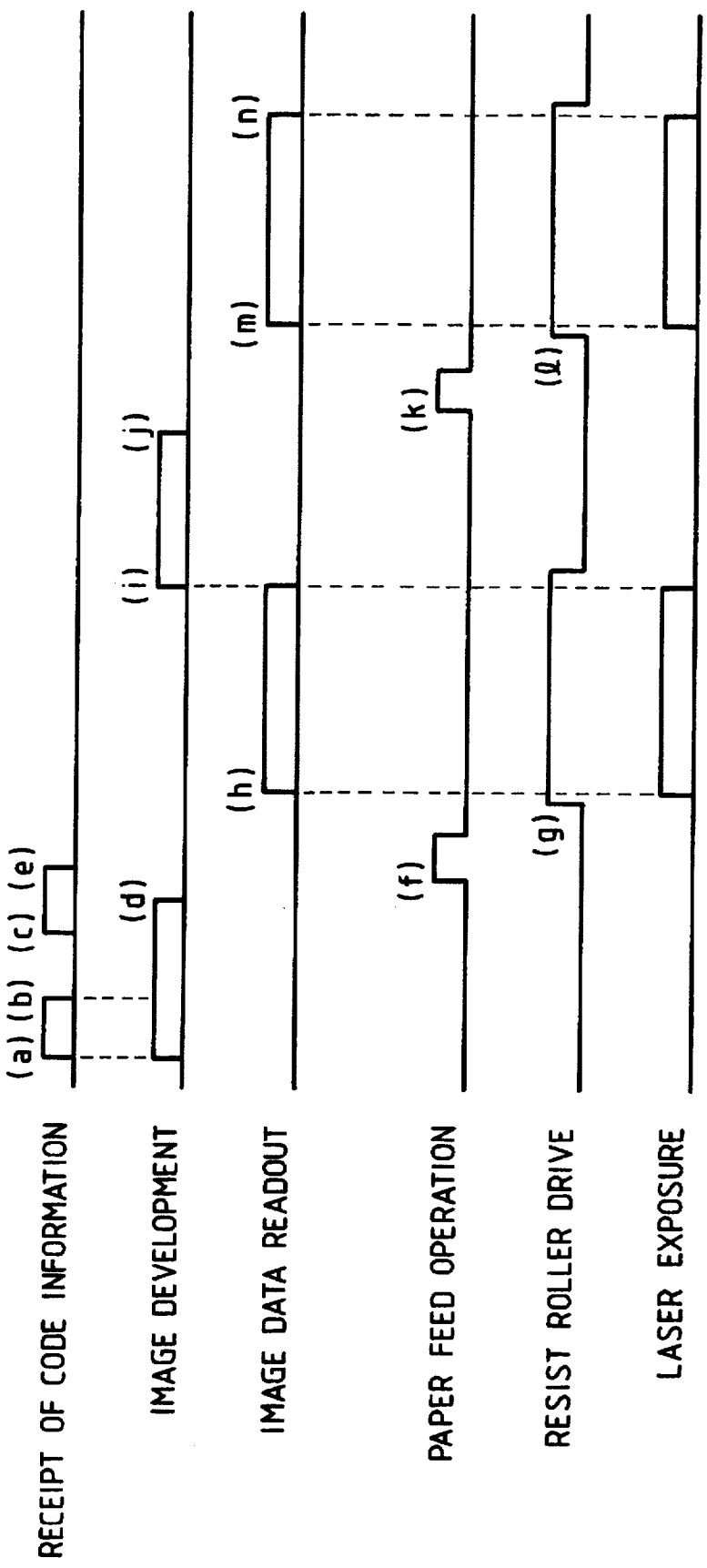

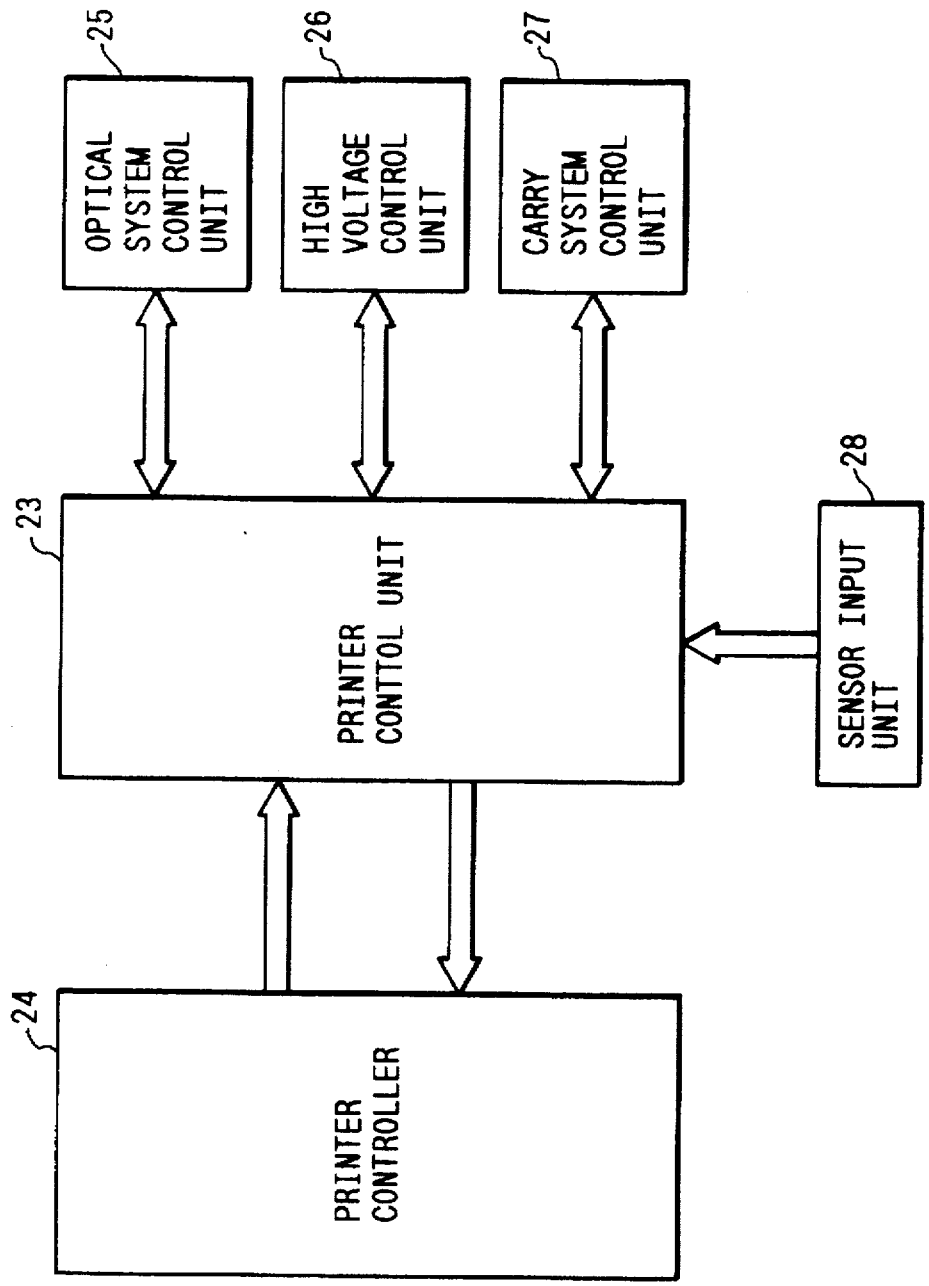

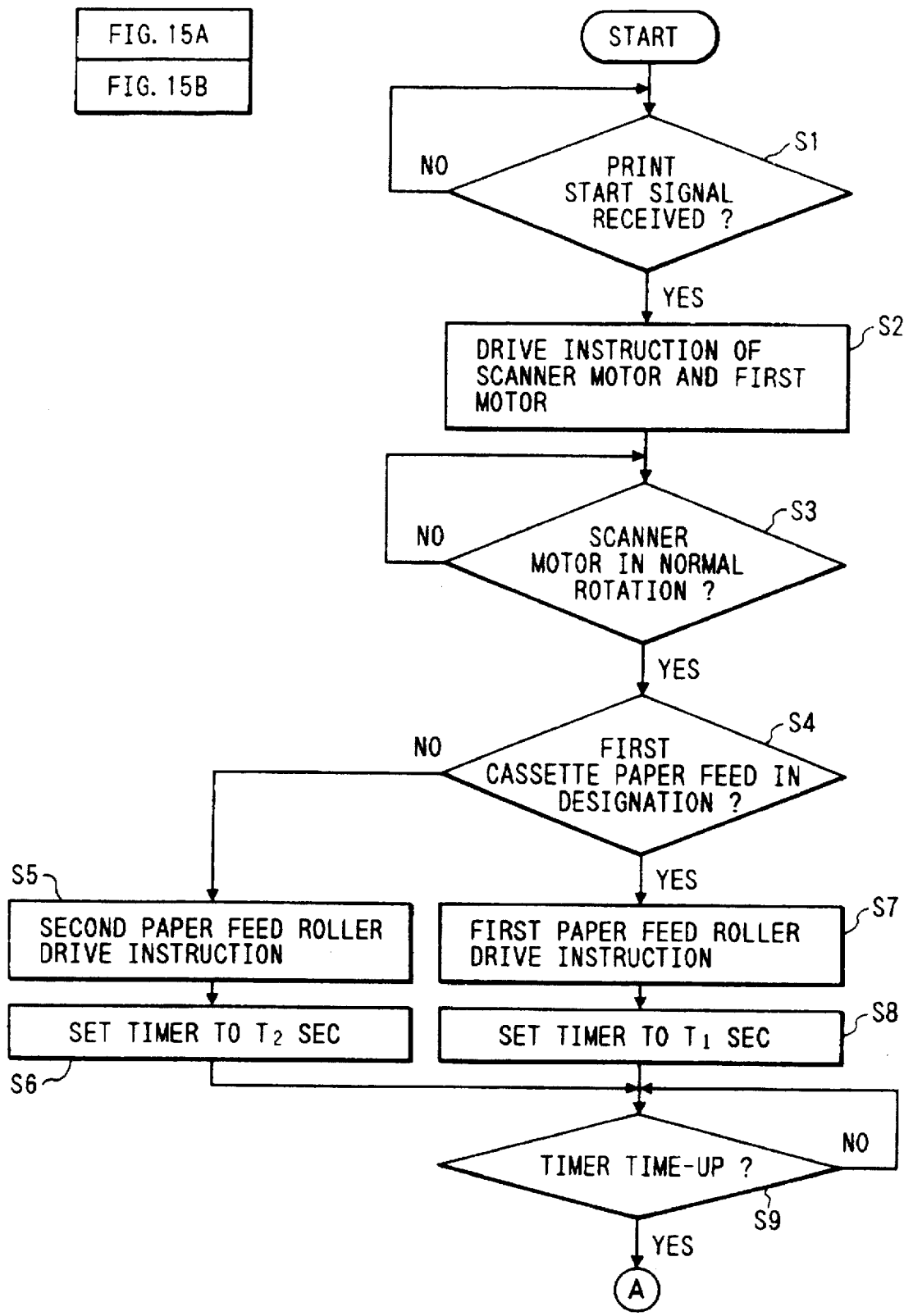

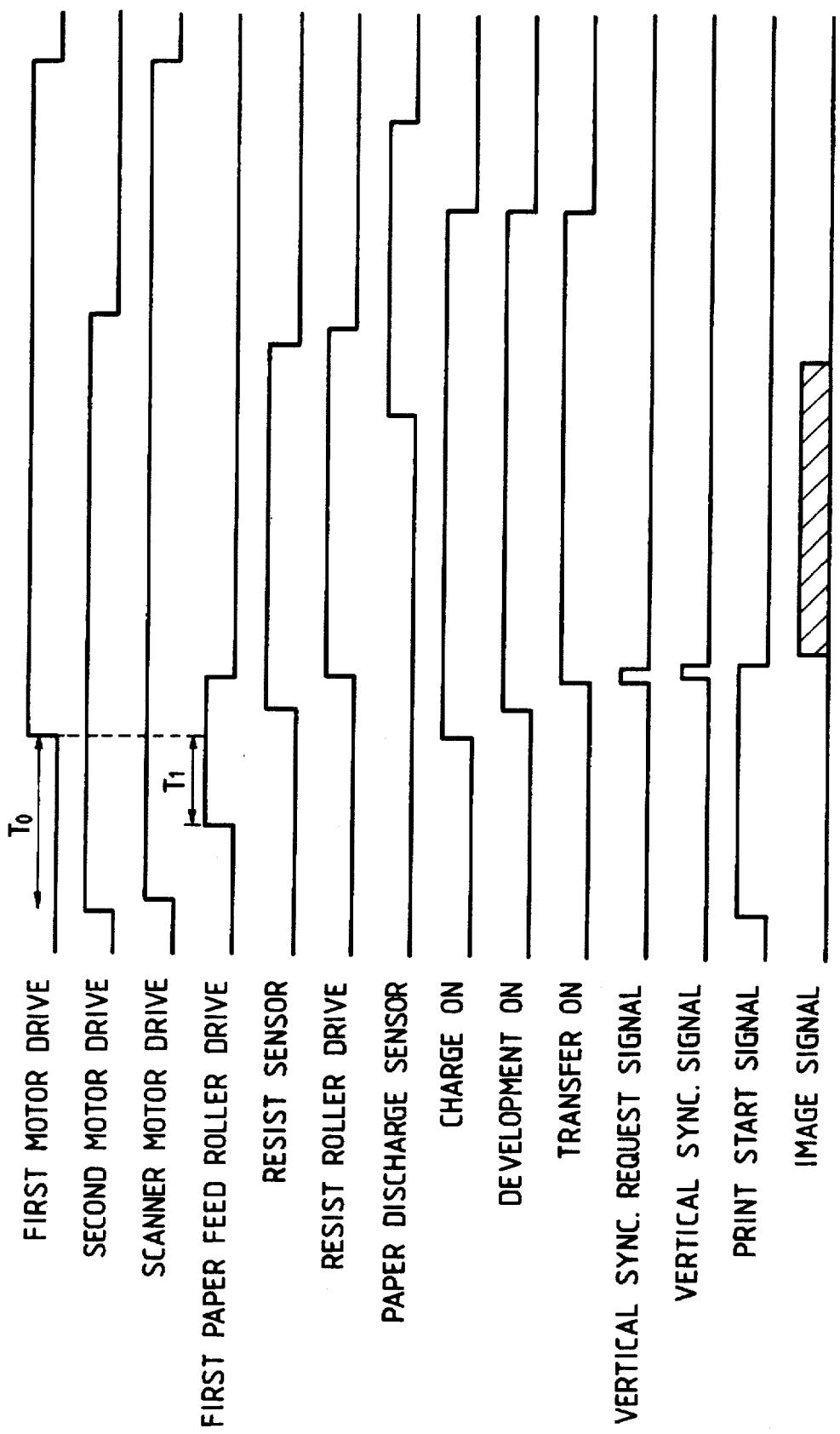

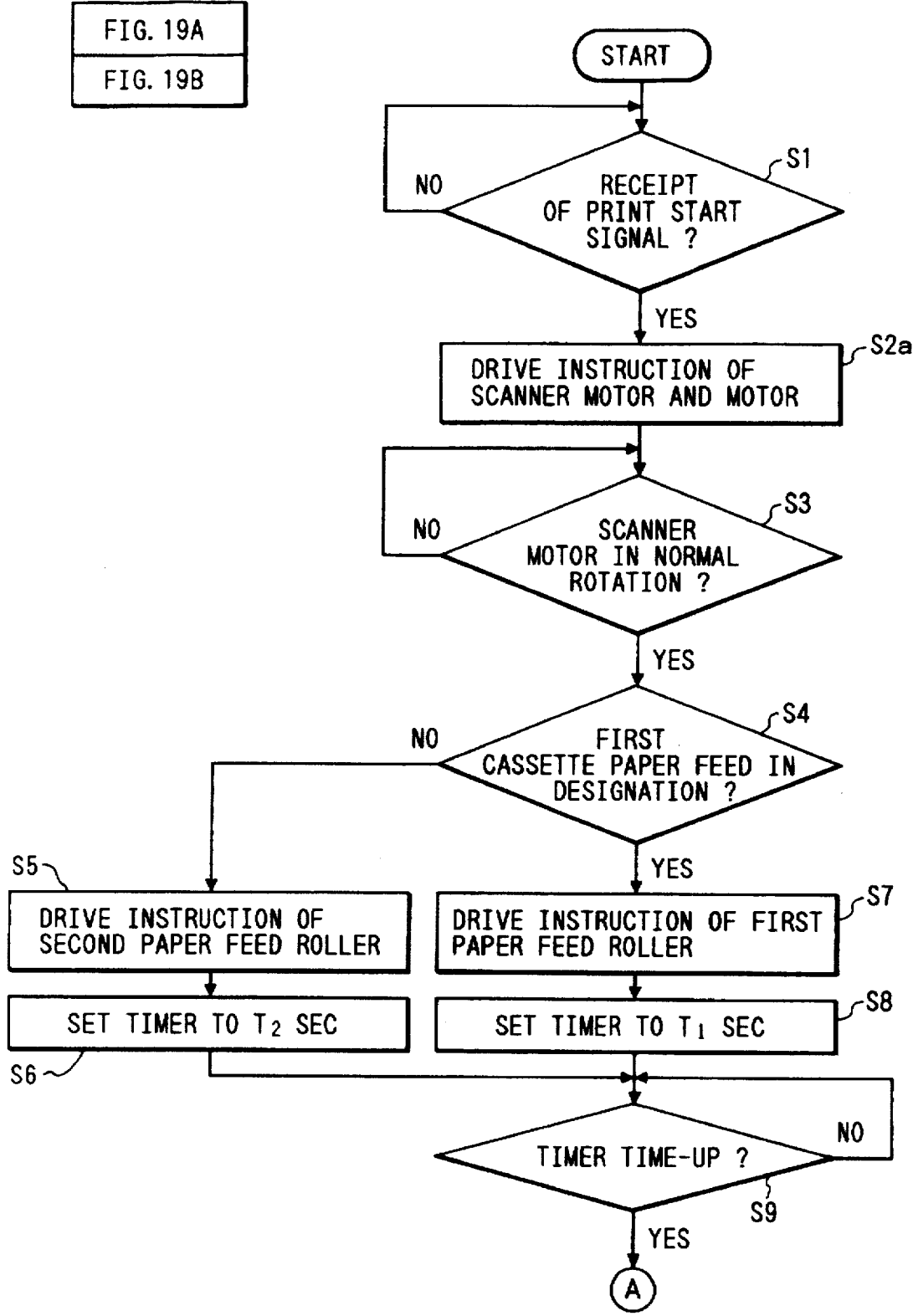

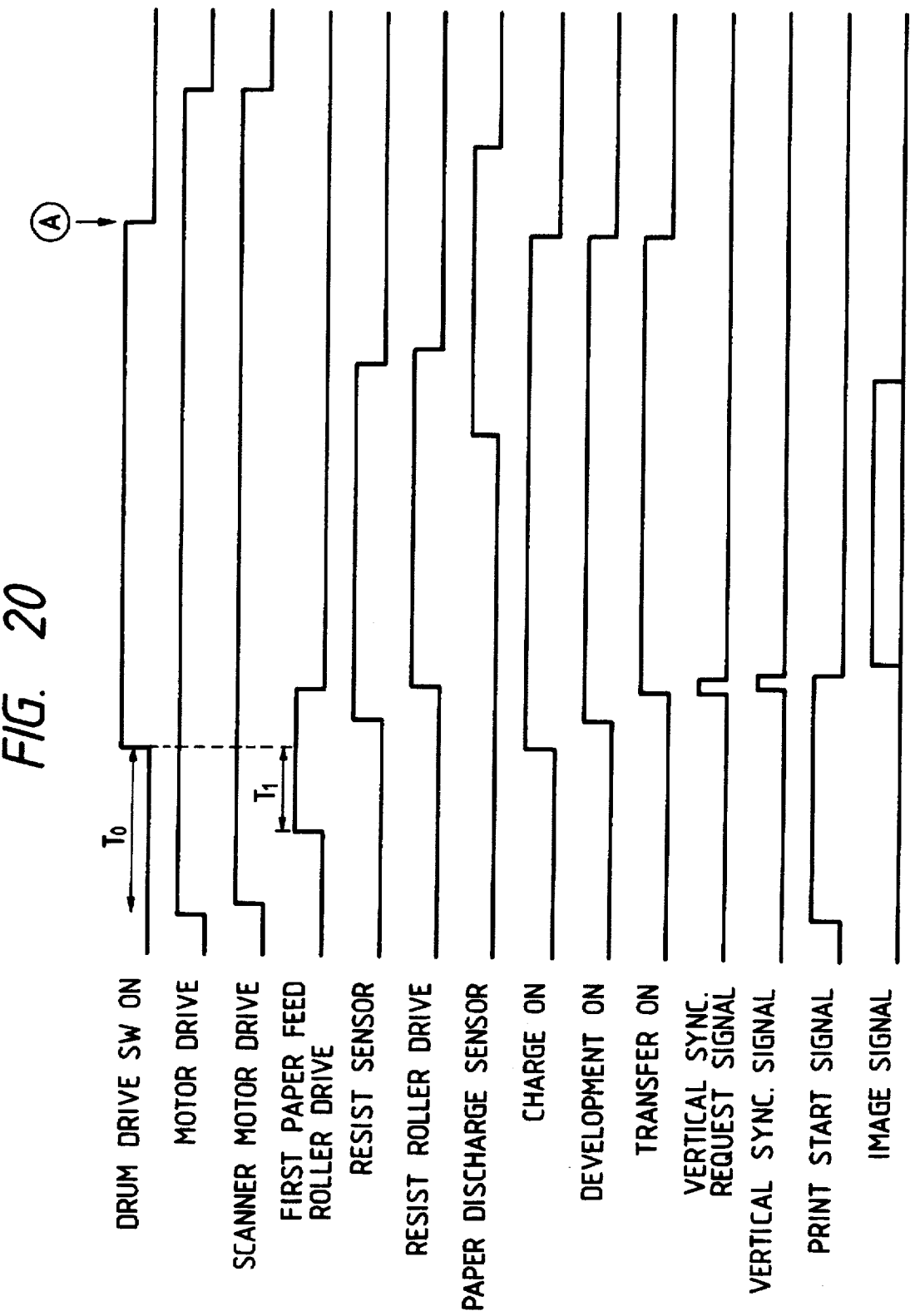

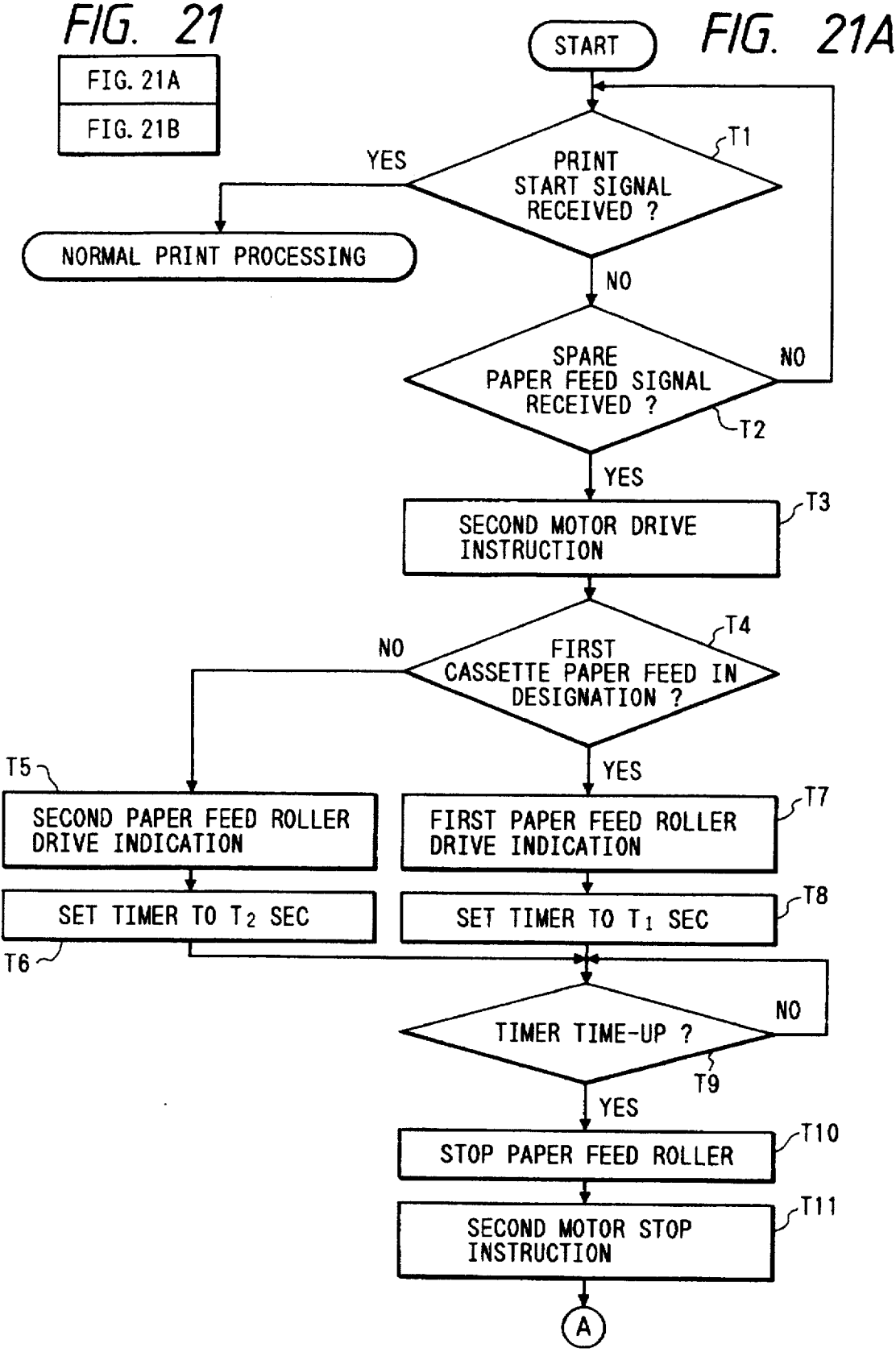

IMAGE FORMING APPARATUS WITH IMAGE CARRIER AND SHEET FEED DRIVE CONTROL

This application is a continuation of application Ser. No. 07/701,505 filed May 16, 1991, now abandoned.

BACKGROUND OF THE INVENTION

1. Field of the Invention

The present invention relates to an image forming apparatus using an electrophotographic process and, more particularly to the image forming apparatus which converts character or pattern information into bit map information (pixel information) and forms an image based thereon.

2. Related Background Art

Since an electrophotographic type printer is capable of printing with high resolution and in high quality, numerous printers such as laser, LED and liquid crystal printers have been developed and widely used in recent years. Complicated patterns and images may be output with high quality.

A controller (such as a controller having an interpreter for the page descriptive language within) for processing complicated image data over one page of printed surface requires an image memory (hereinafter called "page memory") at least for one page. To print, for example, on paper A4 in size with a resolution of 300 dpi, a page memory of 1 M byte is required.

A considerable amount of image information are thus processed by high quality printers. For this reason, image data, which are transmitted from computers and other information processing equipment system to printers, are mostly not first-hand raster image data, but coded or programmed data.

Accordingly, it represents the performance of a page printer how fast coded image information for one page is converted into raster image information for one page for printing.

A prior art for control of this page printer will be shown below.

FIG. 1 shows a sectional view of a laser beam printer representing page printers. FIG. 2 is a schematic block diagram of control circuit for a general laser printer.

In FIG. 2, numeral 225 shows an information processing equipment (such as a personal computer and work station) outside a laser printer. An external interface 227 (such as a Centronics parallel interface or an RS-232 serial interface) transmits coded or programmed image information (such as ASCII code and postscript program. These will be hereinafter called "code information") to the laser printer. The code information is received by an interface circuit 218 within the laser printer.

A microprocessor 217 receives the code information received by the interface circuit 218, through an internal bus 228. This internal bus 228 consists of a data bus, an address bus and a control bus. The microprocessor 217 operates in accordance with the control program within the control program store memory 221. The memory 221 is a nonvolatile ROM.

The microprocessor 217 processes code information obtained from the interface circuit 218 to some degree, and stores in a code store memory 219. The code store memory 219 is a RAM for storing code information. The microprocessor 217 successively stores code information received from outside in a code store memory 219, and at the same time, converts the coded information into image information of dot image into the image data store memory 220. The image data store memory 220 is a RAM (bit map memory) for storing image data.

A DMA controller 222 reads out the data stored in the image data store memory 220, and transmits to a raster conversion circuit 224. The DMA controller 222 may have the internal bus 228 to itself independently of the microprocessor 217. When the microprocessor 217 detects that the image data, which has been stored in the image data store memory 220, has reached data for one page (that is, when it detects that all code data for one page have been converted into image data), the microprocessor 217 activates the DMA controller 222.

The DMA controller 222 and the microprocessor 217 alternately have the internal bus to each of themselves, successively read out image data from the image data store memory 220 in accordance with the request of the raster conversion circuit 224, and transmit the image data into the raster conversion circuit 224. The raster conversion circuit 224 converts the parallel image data received from the DMA controller 222 into serial image data. The serial image data is output into a laser driver (not shown) of a mechanical controller 226 synchronizing with the horizontal synchronizing signal to modulate the laser beam.

The microprocessor 217 does not only develop code data in image data, but also commands various printing processes to the laser printer mechanical controller 226. An I/O driver 223 provides an interface between the microprocessor 217 and the mechanical controller 226.

The mechanical control of a laser printer will be described referring to FIG. 1. In FIG. 1, numeral 201 shows the main body of the laser printer. The microprocessor 217 develops code data for one page, and stores the image data in the memory 220. Then it rotates a carry motor (not shown) through the I/O driver 223. At this time, a photosensitive drum 202, a primary charge roller 205, a development roller 207, a transfer roller 210, a fix roller 215 and a discharge roller 216 start rotating. The rotation of the carry motor is controlled by the mechanical controller 226.

A laser scanning device 203 has a laser scan mirror, a laser scan motor, a laser light emitting element, and a laser driving circuit within. The I/O driver 223 drives the carry motor, and also the laser scan motor within the laser scanning device 203. The I/O driver 223 successively applies a high voltage to the primary charge roller 205, the development roller 207, and the transfer roller 210. The I/O driver 223 also engages a clutch installed to a paper feed roller 212 to feed transfer material 213 loaded on a paper cassette 214.

The fed transfer material 213 stops at a resist roller 211 once, and the mechanical controller 226 notifies the I/O driver 223 that the fed transfer material 213 has arrived at the resist roller 211. When the transfer material 213 has stopped at the resist roller 211, the microprocessor 217 activates the DMA controller 222.

Serial image data is transmitted from the raster conversion circuit 224. The transmitted serial image data is input in the laser scanning device 203, and laser light modulated with the image data is irradiated on the sensitizing drum 202 via mirror 204. A latent image is formed on its sensitizer surface, and is visualized with toner 208 into a toner image by a development unit 206.

The transfer material 213, which has stopped at the resist roller 211, is carried by the resist roller 211 again, and the toner image is transferred on the transfer material 213 by a transfer roller 210. The transfer material 213, which has been attached with toner, is heat fixed by a fix roller 215, and thereafter is discharged outside the machine by an discharge roller 216. Toner, which has not been transferred on the transfer material 213 by the transfer roller 210, is collected in a cleaner 209.

The code information thus provided by the external information processing equipment is printed on the transfer material 213 as the image information.

To print pages of data, printing is performed with such a timing as shown in FIG. 3. In FIG. 3, the microprocessor 217 starts receiving code information with timing of (a). At the same time, the microprocessor 217 starts developing the image, and stores the image data in the memory 220. After completing the reception of the code data on the first page with timing of (b), the microprocessor continuously starts receiving the code information on the second page with timing of (c).

After the image on the first page has been developed with timing of (d), the microprocessor rotates the carry motor to feed paper with timing of (f). The resist roller 211 is driven with timing of (g), and the DMA controller 222 starts reading out the image data with timing of (h). A serial image data is formed by the raster conversion circuit 224 with timing of (h) to start laser exposure.

The laser exposure on the first page is completed with timing of (i). Also, the reception of code information on the second page has been already completed with timing of (e), and the development of image on the second page similarly starts with timing of (i). Thereafter, the printing operation for the second page is performed in the same sequence as on the first page.

In FIG. 3, periods (a) to (d) and (i) to (j), in which image development is performed, is completely separated from a period (h) to (i) (which is also a laser exposure period) for image data read out, and both have not an overlapped period. This is because the image memory has only one page.

In such a method, no access to the image memory 220 has been performed in a period of (f) to (h) (or a period of (k) to (m)). Therefore, in a laser beam printer ("LBP") with a very long distance between a paper feed roller 212 and a resist roller 211, the throughput (number of printed sheets per unit time) lowers. If an image memory for two pages is provided, the throughput can be improved by overlapping the image development period with the image data read out period. In this case, however, the memory cost will double.

To solve this defect, the present applicant proposed such a recording apparatus as disclosed in U.S. Ser. No. 558,322 filed on Jul. 26, 1990 now U.S. Pat. No. 5,455,603.

According to this proposal, when it has received code information for one page from an external information processing equipment 225 such as the host computer, the microprocessor 217 starts feeding transfer material 213 such as paper, and stops carry of the transfer material 213 in place to allow it to stand by.

Thereafter, when it has developed code information in image data of dot image, the microprocessor 217 successively transmits this image data of dot image to the mechanical controller 226 as serial image data, and modulates the laser light to expose an electrophotographic sensitizing drum 202, and at the same time, to resume the carry from the stand-by state so that the transfer material 213 synchronizes with the exposure image.

When, however, it takes long to develop the code information in image data of dot image, the deteriorated sensitizing drum 202 due to charging for a long time, and the surface peeling or surface flaw of the sensitizing drum 202 at a cleaner 209 due to rotation of the sensitizing drum 202 for a long time, and worn cleaner 209 occur.

To prevent these troubles, the following method is also considered. That is, after a specified time elapsed in a stand-by state of the transfer material, the I/O driver 223 turns off the high voltage to the development roller 207 and the transfer roller 210 to level the surface of the sensitizing drum 202 to an uniform potential only by a primary charge roller 205. Thereafter, the I/O driver stops the drive of the sensitizing drum 202 and the laser scan motor, and stands by until the image development is completed.

When, however, it takes long to develop the code information in the image data of dot image, this method had the following defects because the laser scan motor is stopped to wait for the completion of the image development.

After the image development is completed, the drum drive and the laser scan motor rotation are started, and then a primary charged high voltage is applied to perform a preparatory operation for printing called a series of "pre-rotation" such as charging two surfaces of the sensitizing drum to such a state that a latent image can be formed, and adjusting the laser scanning device.

To charge the surface of the sensitizing drum 202 to such a state that a latent image can be formed, allow the surface of the sensitizing drum 202 to be charged by the primary charge roller twice at most. In an image forming apparatus, for example, with a process speed of 50 mm/sec using a sensitizing drum 202 with a diameter of 30 mm, it takes about two seconds to charge the surface of the sensitized drum 202 to such a state that a latent image can be formed.

In a laser scanning device 203, on the other hand, for scanning the laser beam by a polygon mirror, etc., to irradiate the laser light modulated by the image data on the sensitizing drum 202, it is necessary to stably rotate the polygon mirror, etc. and to stably generate a horizontal synchronizing signal to synchronize in the main scan direction.

In an image forming apparatus 300 dpi, for example, with a process speed of 50 mm/sec using a polygon mirror with six planes, the number of revolutions of the polygon mirror is about 6,000 rpm, and it normally takes about 10 seconds for the laser scanning device 203 to irradiate the laser light modulated with the image data.

When the laser scan motor is stopped to wait for the completed image development in this way, it takes long especially for the laser scanning device 203 to rise. Therefore, it took long to print.

Other conventional image forming apparatus had such a configuration as shown in FIG. 4. In FIG. 4, numeral 1 is a sensitizing drum, a static latent image carrier. Numeral 2 is light beam emitted from a semiconductor laser. A charger 3 uniformly charges the sensitizing drum 1, and a developing device 4 develops a latent image. A transfer roller 5 transfers a developed toner image on paper, and a paper feed roller 6 feeds paper 7. Numeral 8 is a sensor for detecting paper. A resist roller 9 synchronizes the carry of paper with the start of writing an image on the sensitizing drum 1.

A fix roller 10 fixes to paper by melting the toner transferred on paper. A paper detection sensor 11 detects the discharge of paper. A motor 12 collectively drives each of the above-mentioned roller systems, and driving transmission systems 13 to 20 such as gears transmit the driving of this motor to each roller. A switch mechanism 21 cuts off and connects the transmission of a power to drive a paper feed roller 6 by the motor 12, and a switch mechanism 22 cuts off and connects the transmission of a power to drive a resist roller 9 by the motor 12.

FIG. 5 shows the control unit of a printer having such a configuration. A printer control unit 23 collectively controls the printing operation of the printer in accordance with the instruction from a printer controller 24. This printer control unit 23 requests each of the following units for driving, and receives input information: an optical system control unit 25 for controlling the drive of an optical system such as scanner control and laser drive, a high voltage control unit 26 for driving high voltage around a sensitizing drum such as charge, development, transfer and fix, and a fixer, a carry system control unit 27 for driving a paper carry system, and a sensor input unit 28 for inputting a signal from the sensor.

In addition, the printer control unit 23 receives an indication to a printer controller 24, communicates to notify the state of its own, and receives an image signal with a specified timing.

The actual printer operation is shown in FIG. 6 Timing Chart.

First, ① on receipt of a print start signal from the printer controller, ② the motor starts driving, and ③ after a lapse of a specified time, the scanner motor starts driving. When the scanner reaches a normal revolution, ④ ⑤ ⑥ each high voltage for charge, development and transfer is successively turned on. After the sensitizing drum has been initialized, ⑦ the paper feed roller is driven. ⑧ In a specified time after the resist sensor has detected the front end of paper, ⑨ the paper feed roller stops and at the same time, a vertical synchronous request signal is output to the controller.

⑩ On receipt of a vertical synchronous signal thereafter, ⑪ the resist roller starts driving to start writing an image. Thereafter, when the paper discharge sensor has detected the rear end of paper, the high voltage is turned off to stop the scanner motor.

In this conventional example, however, only one motor controls the carry system, and the driving transmission system is directly connected to this motor, and therefore, the sensitizing drum is always rotating while the motor is being driven.

For this reason, during a period from the time the paper feed starts after receiving a print start signal from the controller until the paper reaches a specified positions, the sensitizing drum was allowed to be uselessly driven.

Also when improper paper feed occurs at the paper feed unit, the sensitizing drum had to be quite uselessly rotated until the improper paper feed is judged by the printer control unit to be due to paper clogging, and especially when used in intermittent print, the life of the sensitizing drum was not provided with an optimum control.

SUMMARY OF THE INVENTION

It is an object of the present invention to solve each of the above-mentioned problems.

It is another object of the present invention to provide an image forming apparatus capable of preventing useless deterioration of a sensitizing drum.

According to an preferred embodiment of the present invention, a control of drive/stop of a sensitizing drum is separated from a control of drive/stop of a paper feed roller, and control means, in which the sensitizing drum is driven after a lapse of a specified time from feeding paper, is provided in order to prevent the sensitizing drum from being deteriorated due to useless driving.

Especially when it takes long to process an image between pages during printing a plurality of pages, the present invention is effective because the sensitizing drum is stopped between pages. Also when paper feed jam occurs, the life can be extended by preventing the drum from deterioration because the sensitizing drum is not driven.

It is another further object of the present invention to provide an image forming apparatus capable of improving the image forming speed without making the configuration complicated.

According to the present invention, it is possible to prevent the lowered image forming speed due to a preparatory period of the image exposure means by putting the image exposure means for forming an image on the sensitizing drum in a preparatory operation condition or in an operating condition before operating the means for driving the image carrier (sensitizing drum).

The above-mentioned objects and other objects and merits of the present invention will appear more fully from the attached drawings, the following description and Claims.

BRIEF DESCRIPTION OF THE DRAWINGS

FIG. 3 is a timing chart of assistance in explaining the operation of a laser printer according to the prior art.

FIG. 5 shows an electric configuration of the prior art.

FIG. 16 is a timing chart showing an example of the operation of the fourth embodiment.

FIG. 20 is a timing chart showing an example of the operation of the fifth embodiment.

DESCRIPTION OF THE PREFERRED EMBODIMENTS

[First Embodiment]

Figure 1:
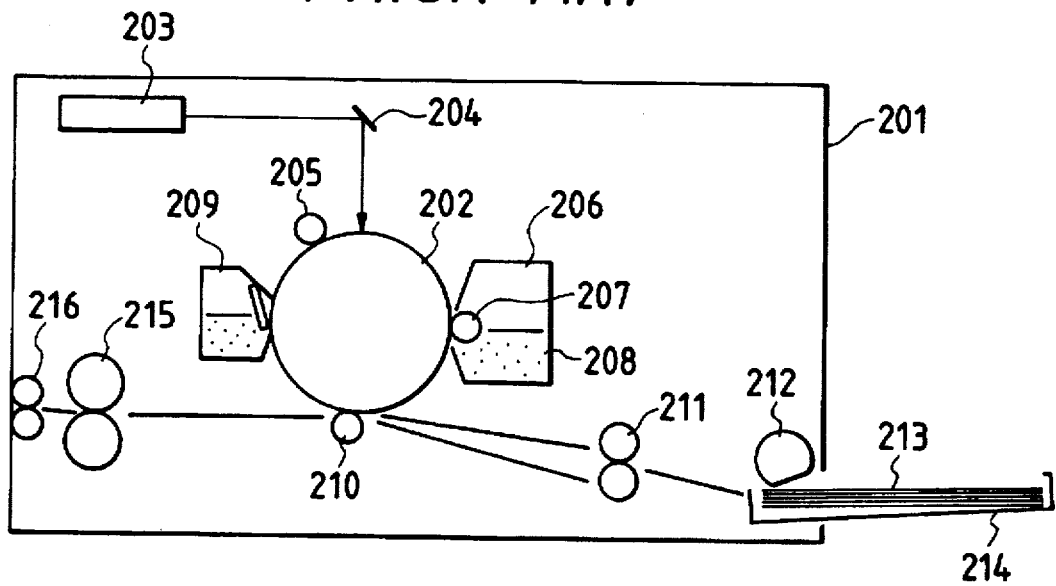
FIG. 1 is a sectional view of a laser printer according to a prior art.
Figure 4:
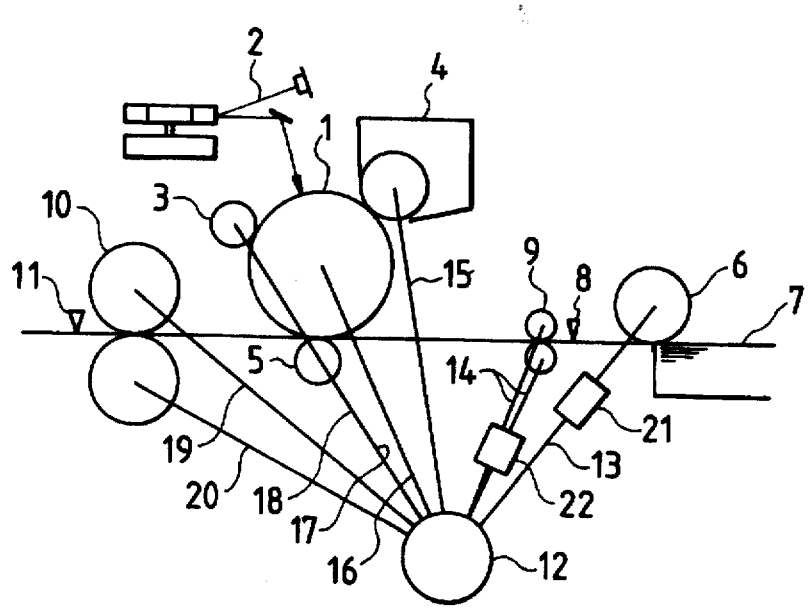
FIG. 4 shows a configuration of another prior art.
Figure 2:
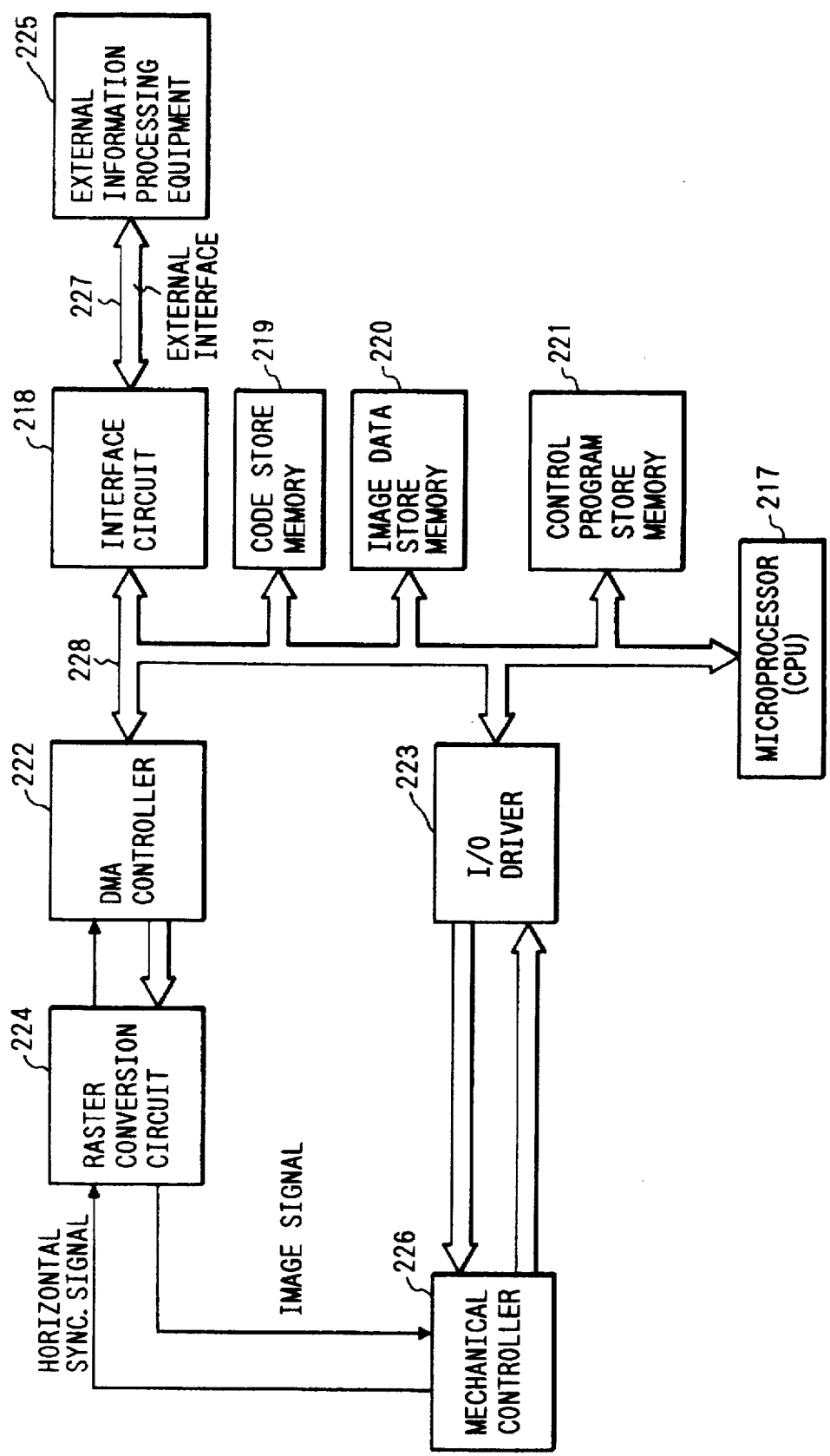
FIG. 2 is a schematic block diagram of control circuit of a general laser printer.
Figure 7:
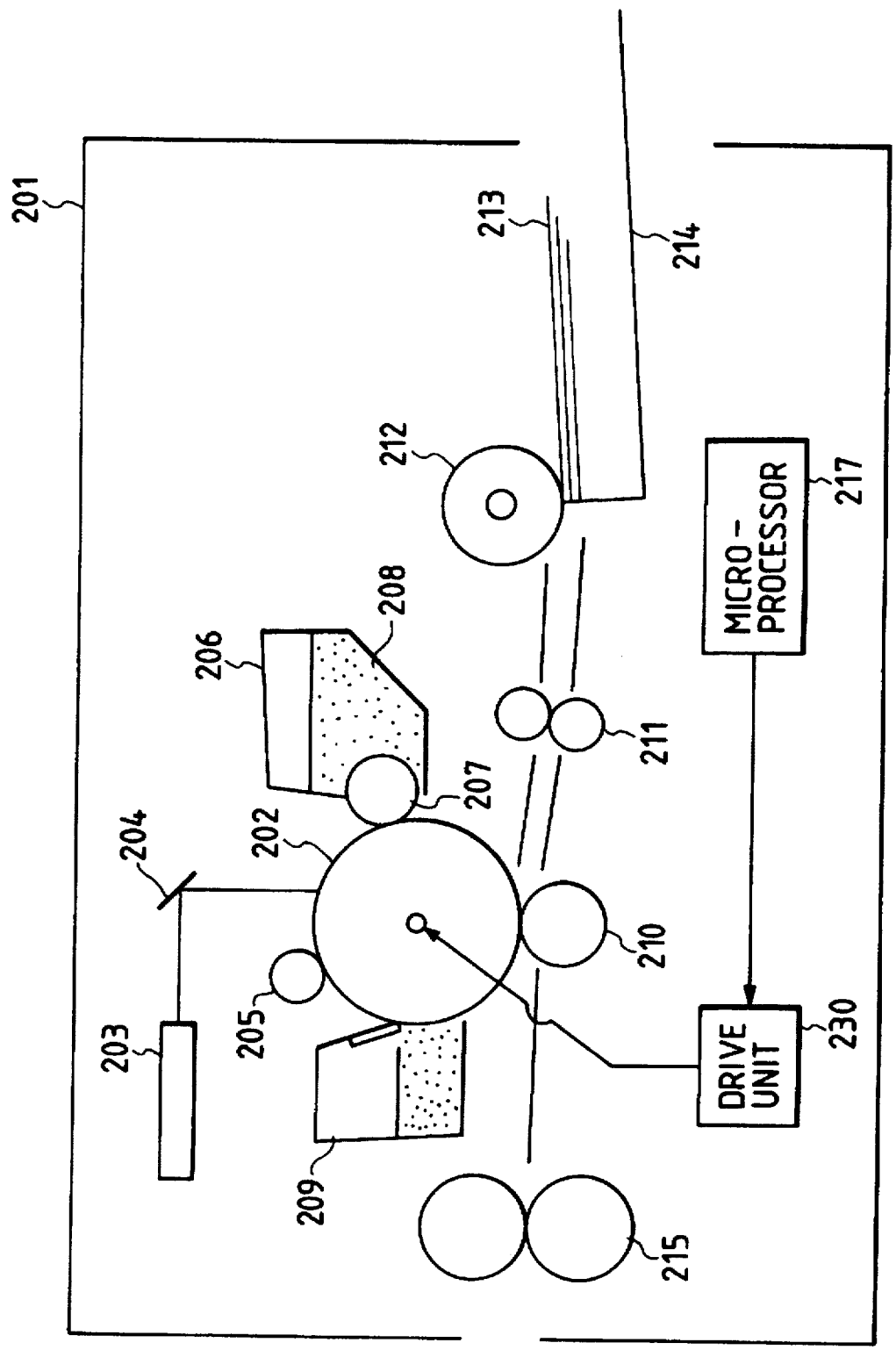
FIG. 7 is a configuration diagram of the main body of an image forming apparatus (laser printer) 1 of the first embodiment according to the present invention.

FIG. 7 is a configuration diagram of the main body showing an image forming apparatus (laser printer) 201 of the first embodiment according to the present invention. The configuration of the control unit for generating an image signal and controlling a printer is the same as the configuration in FIG. 2 described in the prior art, and its detailed description is omitted here.

A feature of the first embodiment of an image forming apparatus according to the present invention is to wait for completion of the image development without stopping the laser scan motor for the laser scanning device 203 though the drum drive is stopped after leveling the surface of the sensitizing drum 202 to an uniform potential only by the primary charge when a time required to convert the coded character or pattern information received from the information processing equipment from the time of starting the paper feed operation into pixel information is longer than a predetermined time Tf in order to prevent the deteriorated sensitizing drum 202 due to charging for a long time, and the surface peeling or surface flaw of the sensitizing drum 202 at a cleaner 209 due to rotation of the sensitizing drum 202 for a long time, the worn cleaner 209, etc. and to prevent the lowered throughput.

In FIG. 7, the surface of the electrophotographic sensitizer (sensitizing drum) 202 is uniformly charged by a charge roller 205, and the image is exposed to form the latent image by irradiating laser light from the laser scanning device 203 on the sensitizing drum 202 through a reflective mirror 204. Then a toner 208 within a developing device 206 is developed by a development roller 207.

On the other hand, transfer material 213 loaded on a paper cassette 214 is fed by a paper feed roller 212, and stands by while its front end is held between resist rollers 211. It is fed to a transfer roller 210 so that it is synchronized with the image written on the sensitizing drum 202, and the image is transferred. The image transferred on the transfer material 213 is fixed by the fixer 215, and is discharged outside the machine.

Further toner remaining on the sensitizing drum 202 after the transfer is cleaned by the cleaner 209, and the image forming process after charging is repeated. When a time required to convert the coded character or pattern information received from the information processing equipment from the time of starting the paper feed operation into pixel information exceeds a fixed time Tf, the completion of the image development is waited for without stopping the laser scan motor for the laser scanning device 203 though the drive of the drum is stopped after leveling the surface of the sensitizing drum 202 to an uniform potential only by the primary charging.

Figure 8:
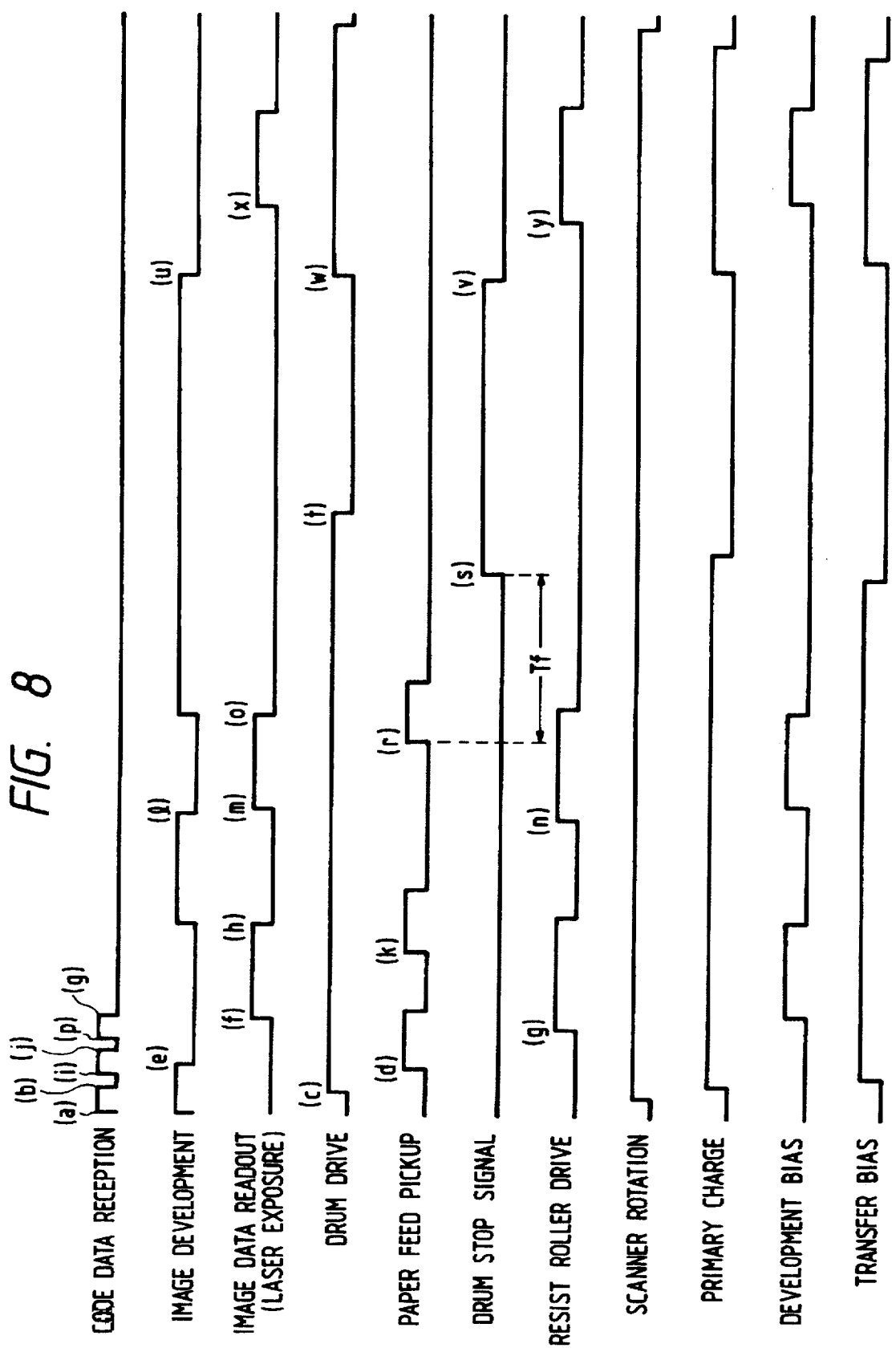
FIG. 8 is a timing chart of assistance in explaining the operation of the first embodiment.

An example of timing chart for sequence operation of the embodiment according to the present invention is shown in FIG. 8. In this example, it is assumed that coded information for three pages have been received in periods (a) to (b), (i) to (j) and (p) to (q).

First with reception of the code information, the development of image for code information (code information received for a period (a) to (b)) on the first page is started in the control unit including the microprocessor 217. When the code information on the first page has been received, the carry motor is driven with timing of (c) to drive the sensitizing drum 202 via drive unit 230 (drum drive), and at the same time, the laser scan motor is driven (scanner rotation).

Then the primary charge and transfer bias are successively applied to start a preparatory operation for printing called a series of "pre-rotation" such as uniformly charging the surfaces of the sensitizing drum 202 and adjusting the laser beam output. Hereafter, with timing of (d), in which the image on the sensitizing drum 202 is synchronized with the transfer material 213, a paper feed roller 212 is driven to carry the transfer material 213 to the position of a resist roller 211 (paper feed pickup).

If the pre-rotation has not been completed even if the image development on the first page has been completed with timing of (e), the image data is not read out, but stands by. When the pre-rotation is completed, read-out of the image data starts with timing of (f). Since a time between a time (d) of starting the paper feed pickup operation and a time (e) of completing the image development is less than time Tf for the first page in this case, a signal for stopping the drum is not transmitted.

With read-out of the image data, the image is written in the sensitizing drum 202 by modulating the laser light from the laser scanning device 203. The resist roller 211 is driven so that the transfer material 213, which has reached the resist roller 211, is synchronized with this sensitizing drum 202 (assuming that the sensitizing drum 202 moves over a distance $l_1$ between the laser exposure position and the transfer roller 210 in a time $T_1$ and the transfer material 213 moves over a distance $l_2 (<l_1)$ between the resist roller 211 and the transfer roller 210 in a time $T_2$, with timing of (g) which is late by the difference between $T_1$ and $T_2$ ($T_1-T_2$)).

When the static latent image written on the sensitizing drum 202 by the laser exposure comes at the development position, a development bias is applied for development.

When the image data on the first page has been read out with timing of (h), the image development for the code information on the second page which has been received in a period (i) to (j) is started.

Since the microprocessor 217 has received the coded information on the second page at this time, the paper feed pickup operation for the second page is being performed with timing of (k) while the image data on the first page is being read out. Since the image development for the second page is longer than the interpaper processing time, the front end of the transfer material is held between resist rollers 211, and waits for the completion of the image development in a formed loop state.

With timing of (l), in which the image development is completed, Tf has not elapsed from the time (k) of starting the paper feed pickup operation, and therefore, the transfer material 213 is fed with timing of (n) without a drum stop signal transmitted, and the image data is read out with timing of (m).

Since the microprocessor 217 has received the code information on the third page, a paper feed pickup operation for the third page is performed with timing of (r) while the image data on the second page is being read out in the same manner as on the second page. After the image data on the second page has been read out, image development on the third page is started.

Since the image development on the third page has not been completed after a lapse of a period Tf from the time (r) of starting the paper feed pickup operation, the microprocessor 217 signals the stop of the drum with timing of (s).

This signal sets the transfer bias to off, only the primary charge levels the surface of the sensitizing drum 202 to an uniform potential, and a drive unit 230 stops the drum (t). At this time, however, the scanner rotation does not stop unlike when the printer operation stops.

After the image development has been completed with timing of (u), the drum stop signal stops with timing of (v). This starts driving the drum again with timing of (w), the primary charge is performed, and the resist roller 11 is driven with timing of (y) to feed the transfer material 213. Since the scanner rotation has not stopped, the image data is read out with timing of (x) as soon as the surface of the sensitizing drum 202 is ready for forming a latent image.

In an embodiment according to the present invention as mentioned above, when the time for rotation of the sensitizing drum from the paper feed pickup operation exceeds Tf, the transfer bias and the primary charge bias are set to off to stop the drum drive. Therefore, it is possible to prevent the deteriorated sensitizing drum 202 due to charging for a long time, and the surface peeling and flaw of the sensitizing drum 202 at a cleaner 209 due to rotation of the sensitizing drum 202 for a long time, and the worn cleaner 209.

Since the laser scan motor is rotating even while the sensitizing drum 202 is stopped, the printing speed does not lower due to the preparatory operation for the laser scanning device during restarting after the image development is completed.

Since this image forming apparatus (laser printer) has not received the code information on the third page and after, no paper feed operation on the fourth page is performed. After the image is transferred on the transfer material 213 on the third page, an operation called "post-rotation" enters, the transfer bias is set to off, only the primary charge levels the surface of the sensitizing drum 202 to an uniform potential, and the transfer material 213 is discharged outside the machine. Then the drum drive and scanner rotation stop to stop the printer.

The Tf value differs with various conditions such as the material of the sensitizing drum 202, configuration of the cleaner 209, and process speed. For example, for the sensitizing drum 202, a sensitizing drum obtained by dispersing phthalocyanine pigment as a charge generating layer to an aluminum cylinder of 30 mm diameter using styrene resin as a binder, or a sensitizing drum obtained by dispersing hydrazone system compound as a charge transporting layer using polycarbonate resin as a binder is used.

For the cleaner 209, a cleaner obtained by abutting an urethane rubber blade 2 mm thick and with 65 degrees (JIS-A) in hardness at an angle of 22° in the counter direction of the sensitizing drum 202 is used. In an image forming apparatus with a process speed of 50 mm/sec, character data, in which image development is completed within three seconds, is used for nine prints out of 10 prints, and character and pattern data, in which more than 10 minutes are required to develop an image, are used for one print.

When 7,000 sheets have been printed at such a cycle, in the case of Tf=5 minutes, the urethane rubber blade in the cleaner 209 has been scratched and improper cleaning occurred. No defective image due to deteriorated sensitizer has occurred.

In the case of Tf=3 minutes, no improper cleaning occurs, but the polycarbonate resin in the surface layer of the sensitizing drum 202 has been peeled, and therefore the electrostatic capacity of the sensitizing drum 202 has increased. The state of charging due to the primary charging becomes insufficient, causing very slight fog on the image. However, there was no problem, but in the case of Tf=1 minute, there was no problem at all.

From the foregoing, the Tf value should be within three minutes, and preferably about 1 minute.

When the frequency of printing, in which it takes time to develop an image, is higher than the above-mentioned condition, the Tf value should be preferably further shorter.

When the frequency is lower on the contrary, the Tf value may be 10 to 30 minutes.

Therefore, the Tf value may be automatically or manually changed in accordance with the frequency of printing, in which it takes time to develop an image.

When such a resin which is easily shaved as acrylic resin is used as the resin for the surface layer of the sensitizing drum 202, when such a material which is easily scratched as silicone rubber is used as the cleaning blade, or when a fur brush cleaning device or a cleaning device, which abuts on a roller, is used, it is desirable that the Tf value is lower than the above-mentioned values.

When hard material such as amorphous silicon is used for an sensitizer as the sensitizing drum 202, the Tf value may be higher.

In a state, in which the drum drive is stopped and scanner rotation is continued, laser lighting to generate a horizontal synchronizing sisal is preferably continued in order to eliminate the rise time for the laser scanning device 203. However, the laser lighting may be stopped after a lapse of a specified time to extend the laser life.

Also in the above-mentioned embodiment, timing was started with the paper feed pickup operation, but timing may be started when starting the image development, or after the paper feed pickup operation has been completed.

[Second Embodiment]

A feature of the embodiment according to the present invention is to wait for completion of the image development without stopping the laser scan motor for the laser scanning device 203 though the drum drive is stopped after leveling the surface of the sensitizing drum 202 to an uniform potential only by the primary charge when a time required to convert the coded character or pattern information received from the information processing equipment from the time of starting the paper feed operation into pixel information is longer than a predetermined time Tf in order to prevent the deteriorated sensitizing drum 202 due to charging for a long time, and the surface peeling or surface flaw of the sensitizing drum 202 at a cleaner 209 due to rotation of the sensitizing drum 202 for a long time, the worn cleaner 209, etc. and to prevent the lowered throughput. The feature is further to wait for the completion of the image development by stopping the laser scan motor after a lapse of a specified time Ts after stopping the drive of the sensitizing drum.

The embodiment according to the present invention shows an example in which another independent microcomputer 240 have been allowed to handle the mechanical control of the laser printer because the above-mentioned control becomes a load for the microprocessor 217.

Figure 9:
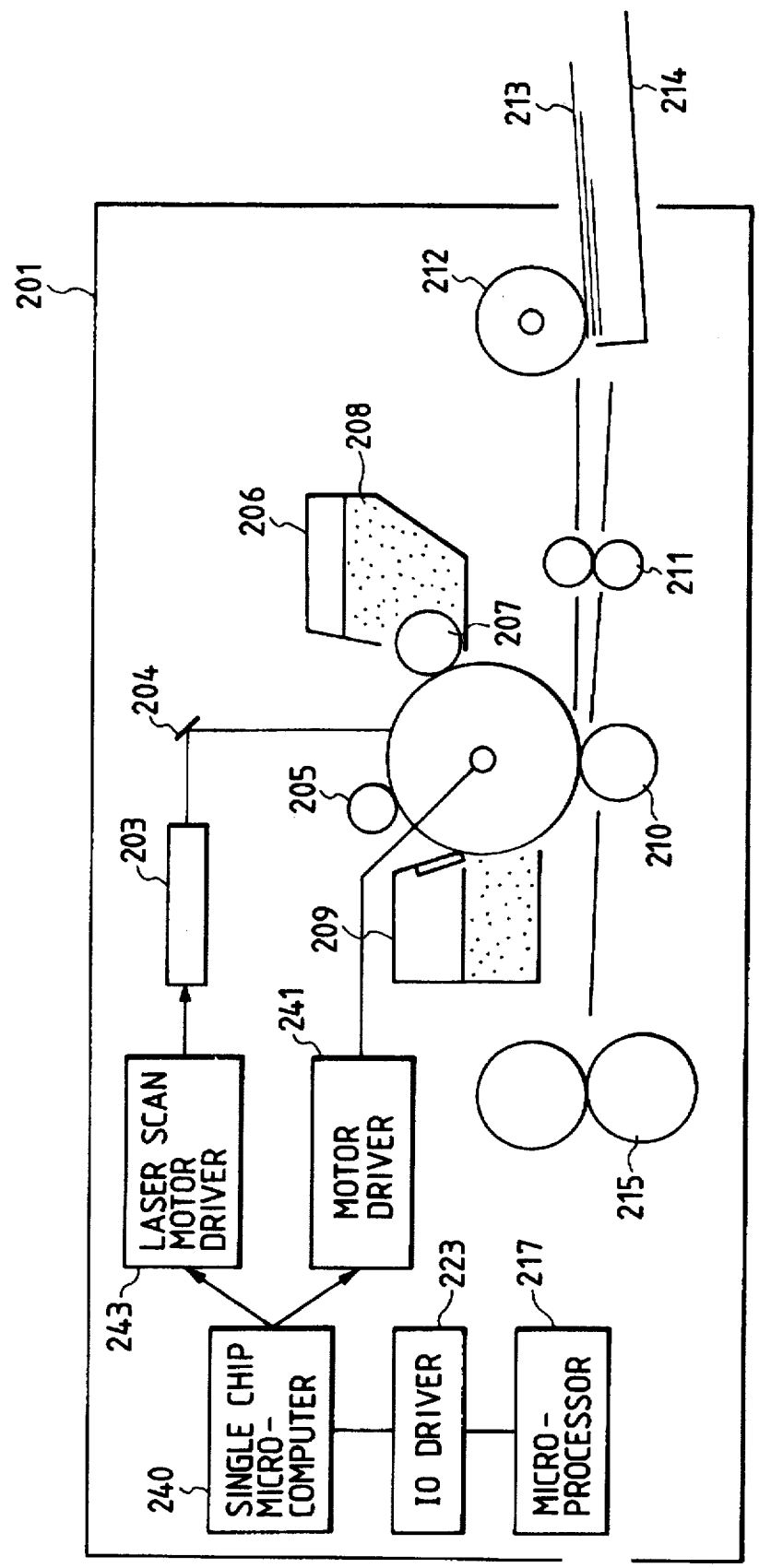
FIG. 9 is a configuration diagram of the main body of the second embodiment according to the present invention.
Figure 10:
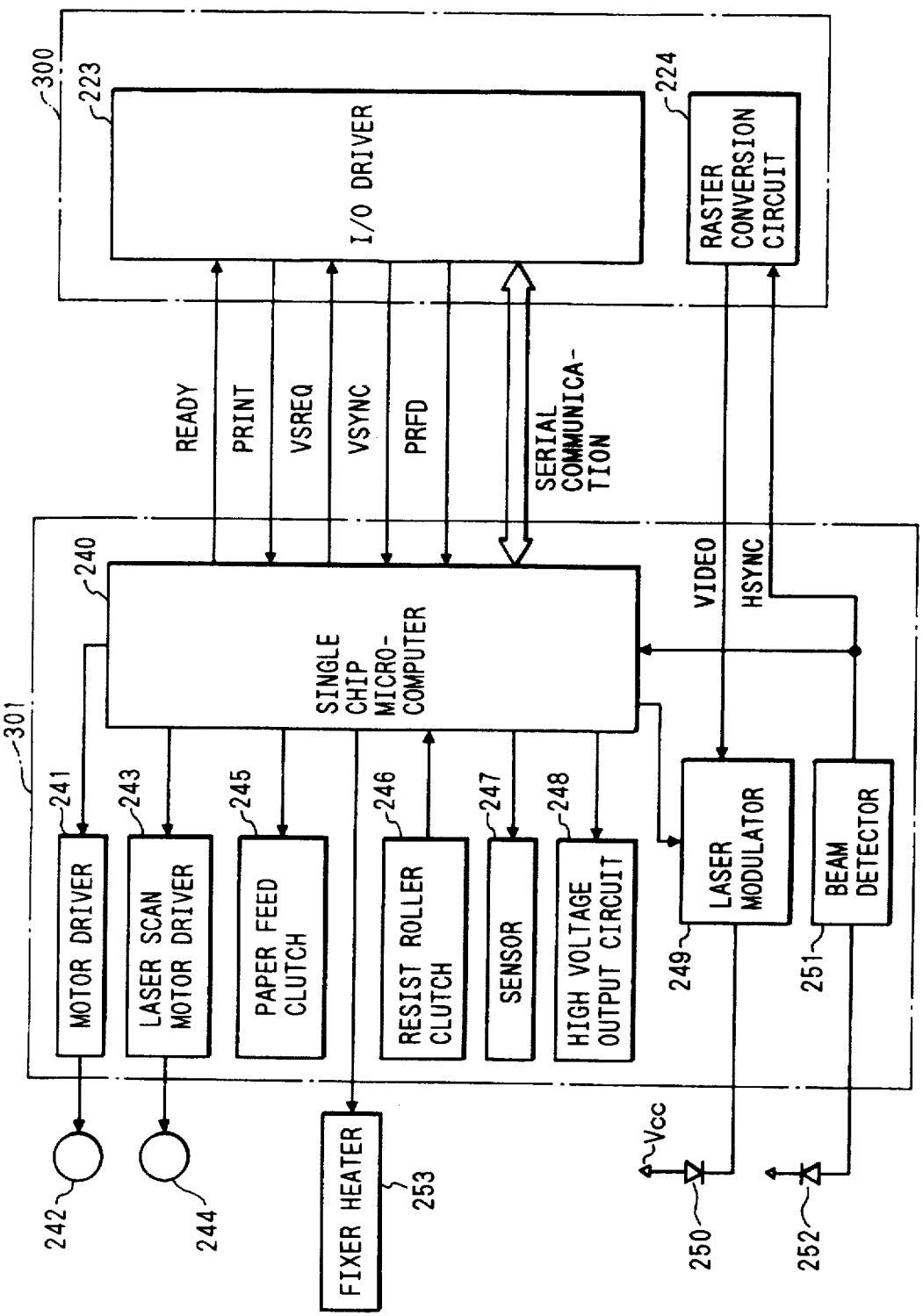
FIG. 10 is a block diagram showing an electric configuration of the second embodiment.

FIG. 9 is a configuration diagram of the main body of an electrophotographic printer of the embodiment according to the present invention. Also a configuration, in which the control of the embodiment is performed, is shown in FIG. 10. The configuration illustrated in FIG. 10 is divided into two: a controller unit 300 for mainly handling image information such as reception of code information for image from the external information processing equipment and image development of code information, and a printer unit 301 for controlling the operation of the printer proper.

In FIG. 10, the mechanical control of the laser printer is performed by a single chip microcomputer 240. As loads for the microcomputer 240, there are a motor driver 241, a laser scan motor driver 243, a paper feed clutch 245, a resist roller clutch 246, a sensor 247, a high voltage output circuit 248, a laser modulator 249, a beam detector 251, etc.

The microcomputer 240 controls those loads in accordance with a command from an I/O driver 223. The READY, PRINT, VSREQ, VSYNC, and PRFD signals are transmitted and received between the microcomputer 240 and the I/O driver 223. In addition, a serial communication line is also prepared to notify the I/O driver 223 of a state of loading of the printer, and to transmit a special command from the I/O driver 223 to the microcomputer 240.

An image signal (VIDEO signal) output from a raster conversion circuit 224 is input into a laser modulator 249, and beam output from a semiconductor laser 250 is modulated in accordance with the VIDEO signal. The laser beam is scanned by the laser scan mirror, and the scanned laser beam falls upon a photodiode 252 located on a scanning path for the laser beam. The laser beam is converted into a pulse signal by a beam detector 251. The pulse signal output from the beam detector is input into the raster conversion circuit 224 as a horizontal synchronizing signal (HSYNC signal).

Figure 11:
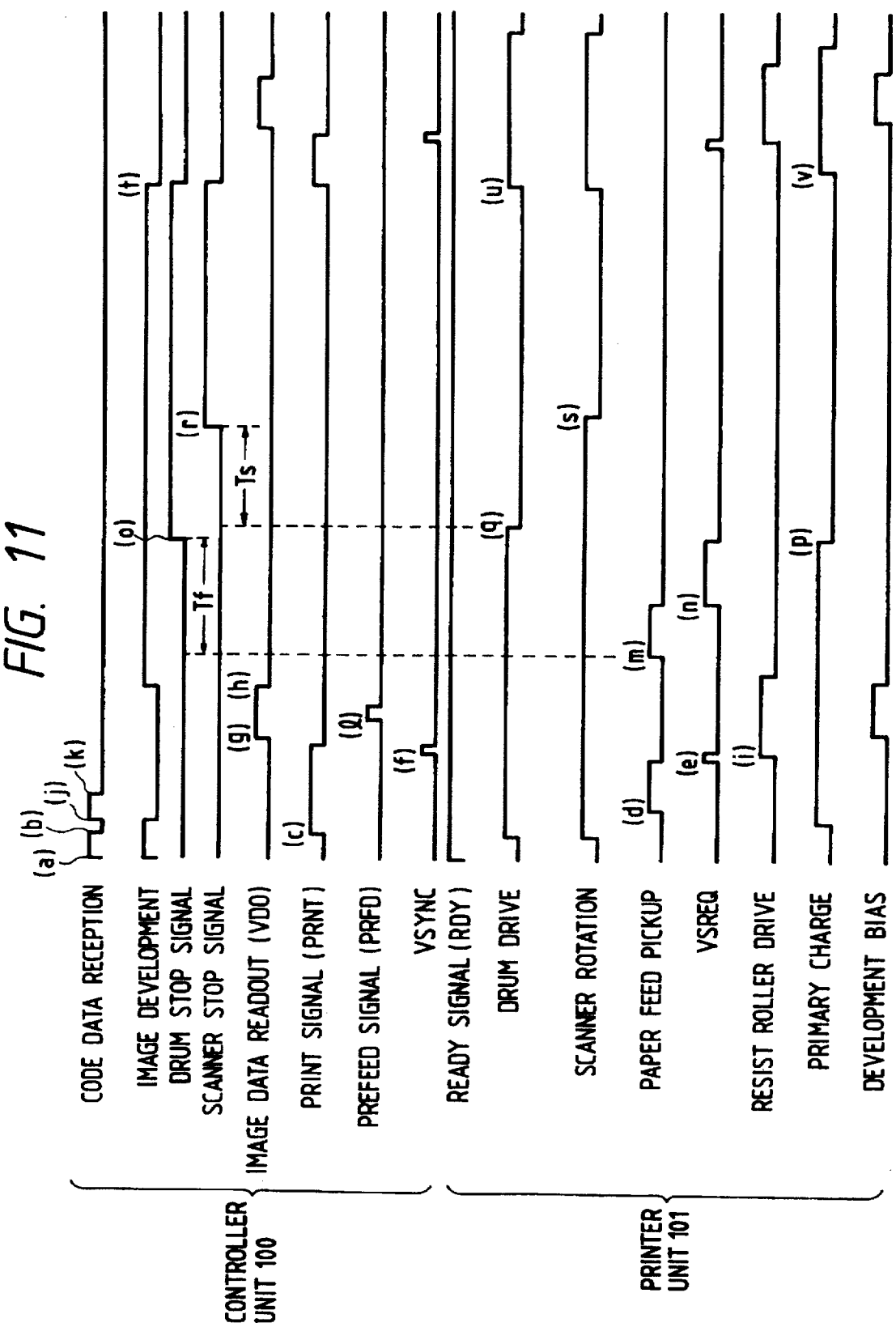
FIG. 11 is a timing chart of assistance in explaining the operation of the second embodiment.

When code information, in which it comparatively does not take time to develop an image on the first page, is received and code information, in which it takes time to develop an image on the second page, is received, the operation will be described referring to FIG. 11 Timing Chart.

First when the power has been turned on for a printer unit 301 and the printer unit is ready for receiving a print signal PRINT at any time, the ready signal RDY is true. After it has received code information for one page in a period (a) to (b) in this state, the controller unit 300 transmits a print signal PRINT to the printer unit 301 with timing of (c). Upon receipt of it, the printer unit 301 starts the drum drive and scanner rotation, and successively performs the primary charge, etc. to prepare receiving an image signal.

The paper feed pickup is also performed with timing of (d), and the front end of the transfer material 213 reaches the resist rollers 211. With timing of (e), in which a loop is formed, the VSREQ is made true to notify the controller unit 300 that the printer unit 301 is ready for receiving an image signal. The printer unit 301 waits for an image signal to be transmitted in this state.

On the other hand, the image for the code information is developed in the controller unit 300. After the image development, the controller unit 300 transmits VSYNC notifying of the start of the image data transmission with timing of (f), in which the VSREQ is true. Then the image data is read out, and is transmitted to the printer unit 301 as a video signal (VDO) in a period (g) to (h).

On receipt of the VSYNC signal in the printer unit 301, the transfer material 213, which has stood by, is fed to the sensitizing drum 202 by timing to synchronize the front end of the image to that of the transfer material 213 through the drive of the resist rollers 211 with timing of (i), and is transferred by a transfer roller 210.

The controller unit 300 has received code information on the second page in a period (j) to (k), and transmits a prefeed signal (PRFD) to start the paper feed operation irrespective of the operation of the image development means with timing of (l).

On the receipt of the prefeed signal PRFD in the printer unit 301, the paper feed pickup is performed with timing of (m), in which the maximum throughput can be obtained from this laser printer. The front end of the transfer material 213 reaches the resist rollers 211, and the VSREQ signal is made true to notify the controller that the printer unit is ready for receiving an image signal with timing of (n) in which a loop is formed. The printer unit 301 waits for an image signal to be transmitted in this state.

On the other hand, the image for the code information is developed in the controller unit 300. Since the image development has not been completed after a lapse of Tf from the paper feed pickup operation (m), a drum stop signal is transmitted with timing of (o).

On the receipt of the drum stop signal in the printer unit 301, the single chip microcomputer 240 turns off the primary charge with timing of (p), and stops the drum drive through the motor driver 241 (q).

Since the image development of the controller unit 300 has not been completed after a lapse of Ts from stopping the drum drive, the controller unit 300 transmits a scanner stop signal with timing of (r).

On the receipt of the scanner stop signal in the printer unit, the single chip microcomputer 240 stops the scanner rotation through the laser scan motor driver 243 (s).

With timing of (t), in which the image development is completed, the controller unit 300 stops the drum stop and scanner stop signals, and the single chip microcomputer 340 in the printer unit 301 resumes the drum drive by rotating the carry motor through the motor driver 341 with timing of (u), and at the same time, resumes also the scanner rotation through the laser scan motor driver 343.

The primary charge is resumed with timing of (v), and when the laser scanning device is ready for operation thereafter, a VSREQ signal is transmitted. The controller unit 300 transmits a VSYNC signal to the printer unit, and the printer unit 301 drives the resist rollers 211 to transfer, on the transfer material 213, the read-out (VDO) image for the image in the controller unit. After the read-out of the image data is completed, the printer unit 301 enters the post-rotation, and stops the primary charge, drum drive and scanner rotation to complete the operation.

The Tf value may be determined like the first embodiment. The Ts value is determined in accordance with the life of the laser scan motor, especially the life of the polygon mirror bearing. A value of (Tf+Ts) is desirable to be within three minutes at a number of revolutions of 6,000 rpm using ball bearings. If three minutes are exceeded when the frequency of print with long image development time is very high, runout occurs on the polygon mirror surface, and the image is uneven in the subscan direction.

Since the total number of revolutions of the polygon mirror in the embodiment according to the present invention depends upon the frequency of print with long image development time, the value of (Tf+Ts) may be changed in accordance with this frequency. If a polygon mirror bearing with such a long life as a thrust bearing is used, the value of (Tf+Ts) may be extended to about ten times as long as the ball bearing.

Since the scanner rotation is once stopped for data having an especially long image development time according to the embodiment of the present invention, uneven image caused by the runout of the polygon mirror surface due to worn bearing in the polygon mirror, etc. can be prevented.

Since the controller unit 300 is separated from the printer unit 301, the embodiment can be widely applied to hosts having various page descriptive languages. Also since the control unit 300 is capable of operating irrespective of the paper feed timing of the printer unit 301, the control is simple.

[Third Embodiment]

A feature of the embodiment according to the present invention is that the controller signals the start of the paper feed operation before coded character or pattern information is received from the information processing equipment in a stand-by state, in which the print operation is available at any time, and that the printer starts the paper feed operation in compliance with this signal and at the same time, starts the scanner rotation before the sensitizing drum 202 is driven.

The configuration of the control unit for the image forming apparatus is the same as FIG. 10 of the second embodiment, and its description is omitted.

Figure 12:
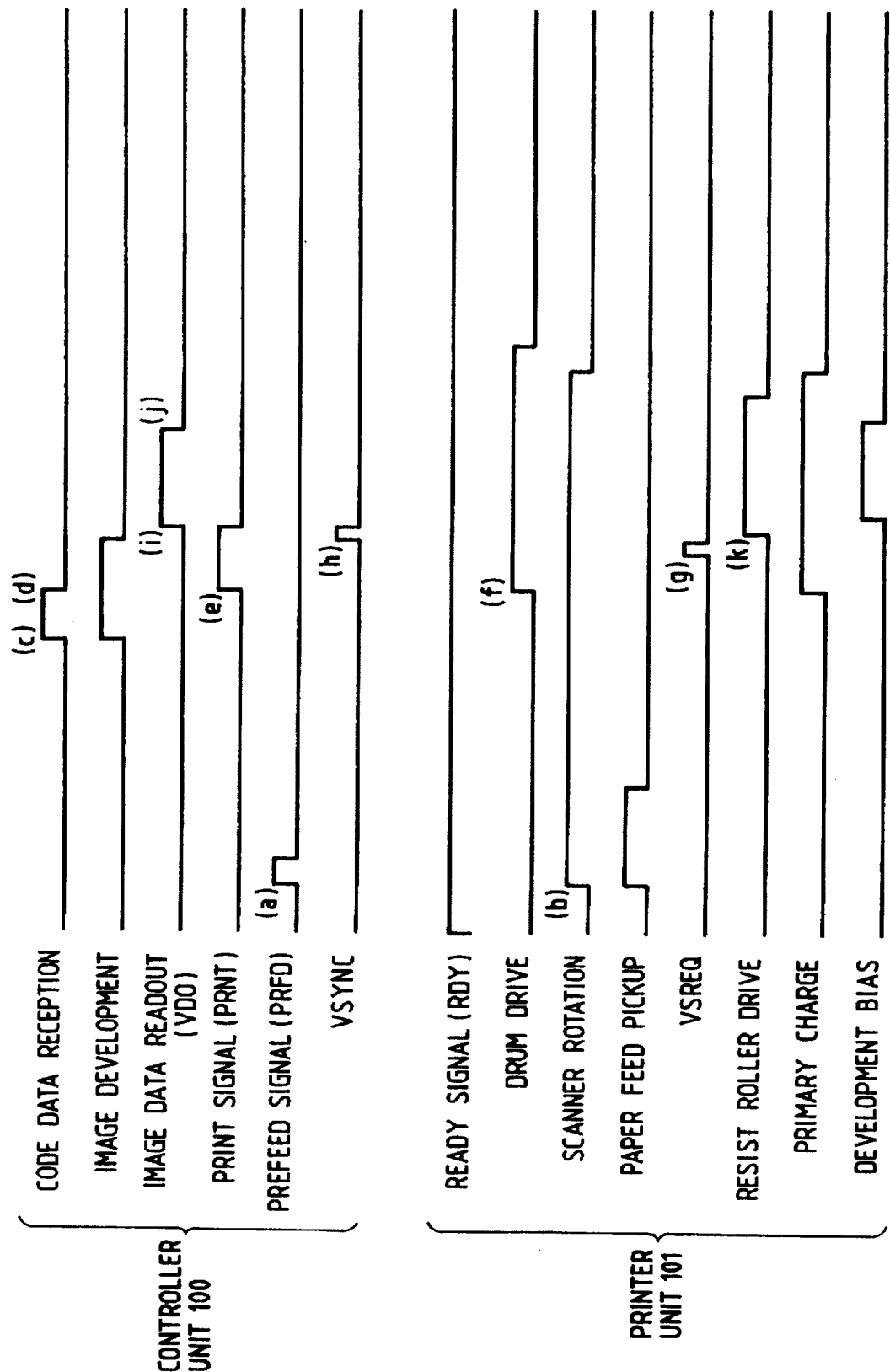
FIG. 12 is a timing chart of assistance in explaining the operation of the third embodiment according to the present invention.

The sequence of the embodiment according to the present invention in FIG. 12 will be described referring to the timing chart.

First when the power has been turned on for a printer unit 301 and the printer unit is ready for receiving a print signal PRT at any time, the ready signal RDY is true. After it receives a command to reserve printing from the information processing equipment in this state, the controller unit 300 transmits a prefeed signal PRFD, a signal for starting the paper feed operation, to the printer unit with timing of (a).

Upon receipt of it, the printer unit 301 starts the scanner rotation and the paper feed pickup with timing of (b), and enters a so-called "stand-by" state.

After it has received code information for one page in a period (c) to (d) hereafter, the controller unit 300 transmits a print signal PRT to the printer unit 301 with timing of (e).

Upon receipt of it, the printer unit 301 performs the drum drive and the primary charge at the same time (f), and makes the VSREQ true to notify the controller unit 300 that the printer unit is ready for receiving an image signal (g).

On the other hand, the image for the code information is developed in the controller unit 300. After the image development, the controller unit 300 transmits VSYNC notifying of the start of the image data transmission with timing of (h), in which the VSREQ is true. Then the image data is read out, and is transmitted to the printer unit 301 as a video signal (VDO) in a period (i) to (j).

On receipt of the VSYNC signal in the printer unit 301, the transfer material 213, which has stood by, is fed to the sensitizing drum 202 by timing to synchronize the front end of the image to that of the transfer material 213 through the drive of the resist rollers 211 with timing of (k), and is transferred by a transfer roller 210.

After the image data has been read out, the printer unit 301 enters the post-rotation, and stops the primary charge, scanner rotation and drum drive to complete the operation because the controller unit 300 has received neither a reserve for the next printing nor code information.

According to this embodiment, a time from the reception of code information to completion of printing can be shortened because the scanner rotation is started before driving the drum for printing.

In this embodiment, the scanner rotation may be once stopped when the image development has not been completed even if a specified time passed from the prefeed signal PRFD.

Also although the controller output the prefeed signal PRFD in accordance with the command from an external equipment in this embodiment, the prefeed signal may be output in accordance with the received code information for one page, for example, to enter a stand-by state.

[Fourth Embodiment]

A feature of the embodiment according to the present invention is that the rotary speed R1 of the scanner in a period for waiting for the image development in the first and second embodiments and a period for waiting for a print signal PRT after the prefeed signal PRFD in the third embodiment is reduced less than the rotary speed R2 in a period for reading out the image data.

Generally, since the rise time of the scanner rotation greatly depends on a low rotary speed range of the laser scan motor immediately after the start, the rise time of the laser scanning device 203 to the rotary speed R2 can be remarkably shortened by leaving the scanner rotated at the rotary speed R1 in the above-mentioned period.

This embodiment is effective to prevent noise in addition to extending the life of the laser scanning device 203.

According to the study by the present inventor et al. concerning noise from the laser scanning device 203, it has been found that the wind noise on the polygon mirror surface is dominant. The frequency f of the noise is, assuming the number of revolutions of the polygon mirror to be R (rpm), and the number of the planes of the polygon mirror to be n, $$f = R/60 \times n \ (Hz)$$

Since the noise rapidly strikes our ears when its frequency exceeds 300 Hz, it is advisable to meet the following equation:

$$R/60 \times n < 300$$

For example, in the case of a polygon mirror with n=6 planes, it is effective to reduce to R<3000 (rpm).

The above embodiments, are a case where the paper feed operation is performed before driving the photosensitive drum.

[Fifth Embodiment]

Figure 13:
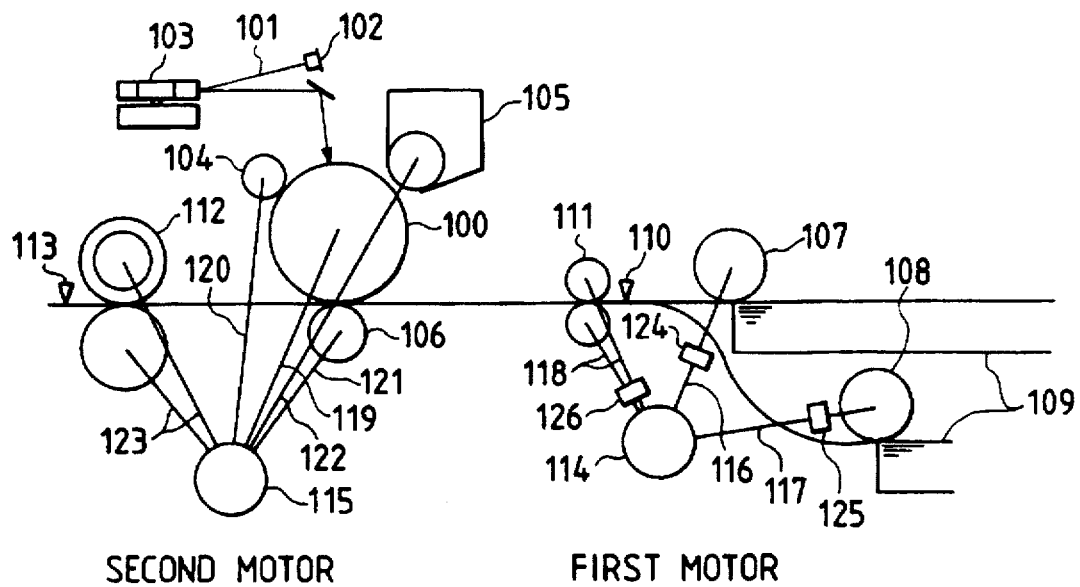
FIG. 13 shows a configuration of the fourth embodiment according to the present invention.

FIG. 13 shows a configuration of a printer in the fifth embodiment according to the present invention. Numeral 100 is a sensitizing drum, numeral 101 is a laser beam, numeral 102 is a semiconductor laser, and numeral 103 is a polygon scanner. A charge roller 104 uniformly charges the sensitizing drum 100, a developing device 105 changes a latent image into a toner image, a transfer roller 106 transfers a toner image on paper, a first paper feed roller 107 feeds paper for a first cassette, and a second paper feed roller feeds paper for a second cassette.

Numeral 109 is a paper cassette. A resist sensor 110 detects the presence of paper, resist rollers 111 synchronizes the carry of paper with writing an image data on the sensitizing drum 100, a fix roller 112 fixes toner transferred on paper by melting, an exhaust paper sensor 113 checks whether or not the paper has been exhausted, a first motor 114 drives the first and second paper feed rollers 107 and 108, and resist rollers 111, and a second motor 115 drives the sensitizing drum 100, charge rollers 104, 105 and 106 around the sensitizer drum, and the fix roller 112.

Driving transmission systems 116, 117 and 118 such as gears transmit the drive of the first motor to the first paper feed roller, the second paper feed roller and the resist roller respectively. Driving transmission systems 119 to 123 transmit the drive of the second motor to the sensitizing drum, each charge roller and the fix roller respectively. A switch 124 cuts off and transmits the drive of the first motor to the first paper feed roller, a switch 125 cuts off and transmits the drive of the first motor to the second paper feed roller, and a switch 126 cuts off and transmits the drive of the first motor to the resist rollers. For the first and second motors, DC motors or stepping motors, etc., for example, are used.

Figure 14:
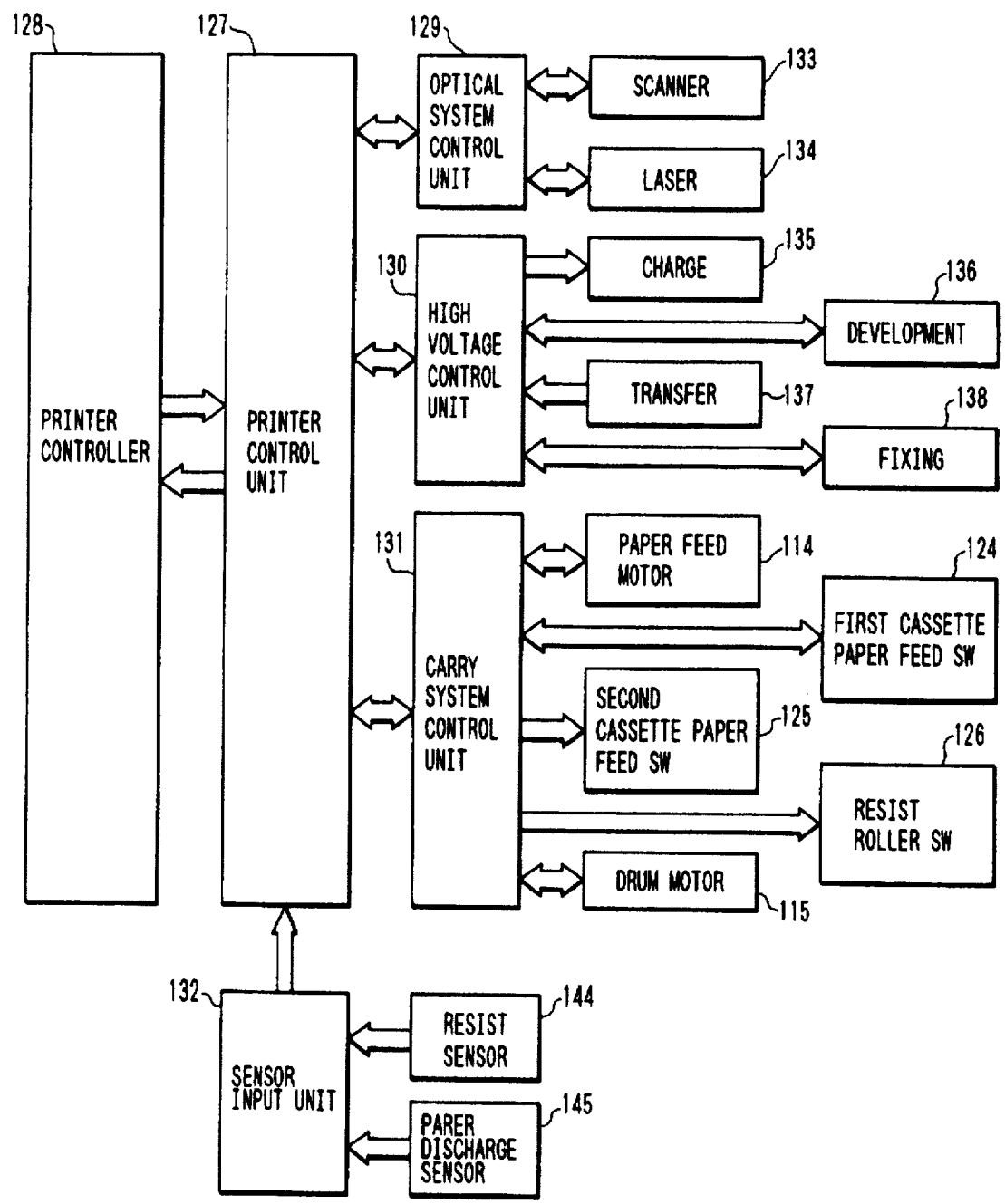
FIG. 14 is a block diagram showing an electric configuration of the fourth embodiment.

FIG. 14 shows a block diagram of the control system.

A printer control unit 127 controls actual printing operation in accordance with a command from a printer controller 128. An optical system control unit 129 exercises control of a scanner 133 such as drive/stop of the scanner motor, and control of a laser 134 such as adjustment of light volume of laser beam and ON/OFF due to an image data.

A high voltage control unit 130 exercises ON-OFF control of high voltage systems 135 to 138 around the sensitizing drum, temperature control of the fix roller, etc. in accordance with a command from the printer control unit 127. A carry system control unit 131 performs drive/stop of the first and second motors, and drive/stop of the first, second paper feed rollers and the resist rollers in accordance with a command from the printer control unit 127. A sensor input unit 132 notifies the printer control unit of the state of a resist sensor 144 and a paper discharge sensor 145.

Figure 15B:
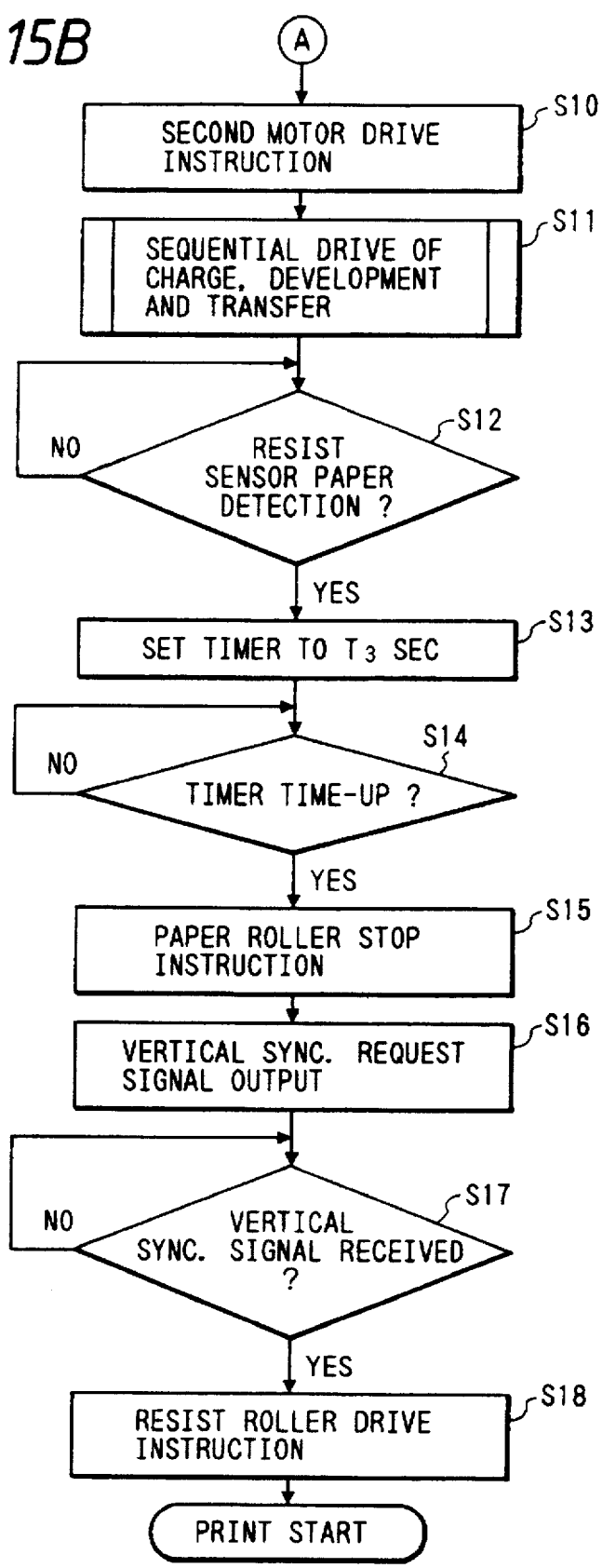
FIG. 15 is a flow chart of assistance in explaining the operation of the fourth embodiment.

A flow chart in FIG. 15 shows what control the printer control unit exercises in such a control system.

First in step S1, the control unit waits for a print start signal from the printer controller 128, starts drive of the scanner motor on receipt of it, and further starts drive of the first motor 114 for the paper feed system (step S2). After the scanner reaches a normal rotation (step S3), the control unit reads whether the first cassette or the second cassette has been designated by the printer controller 128 (step S4), and starts drive of the paper feed roller 107, 108 for a cassette in designation respectively (steps S5, S7).

At this time, the control unit sets a timer $T_1$ (sec) (step S6) for feed paper from the first cassette or a timer $T_2$ (sec) (step S8) for feed paper from the second cassette beforehand. This $T_1$ or $T_2$ is a time required for paper to reach the same point before the resist sensor 110 in FIG. 13 since the paper is fed. When the time for this timer is up (step S9), the control unit commands to start the drive of the second motor 115 for the drum system (step S10).

Figure 6:
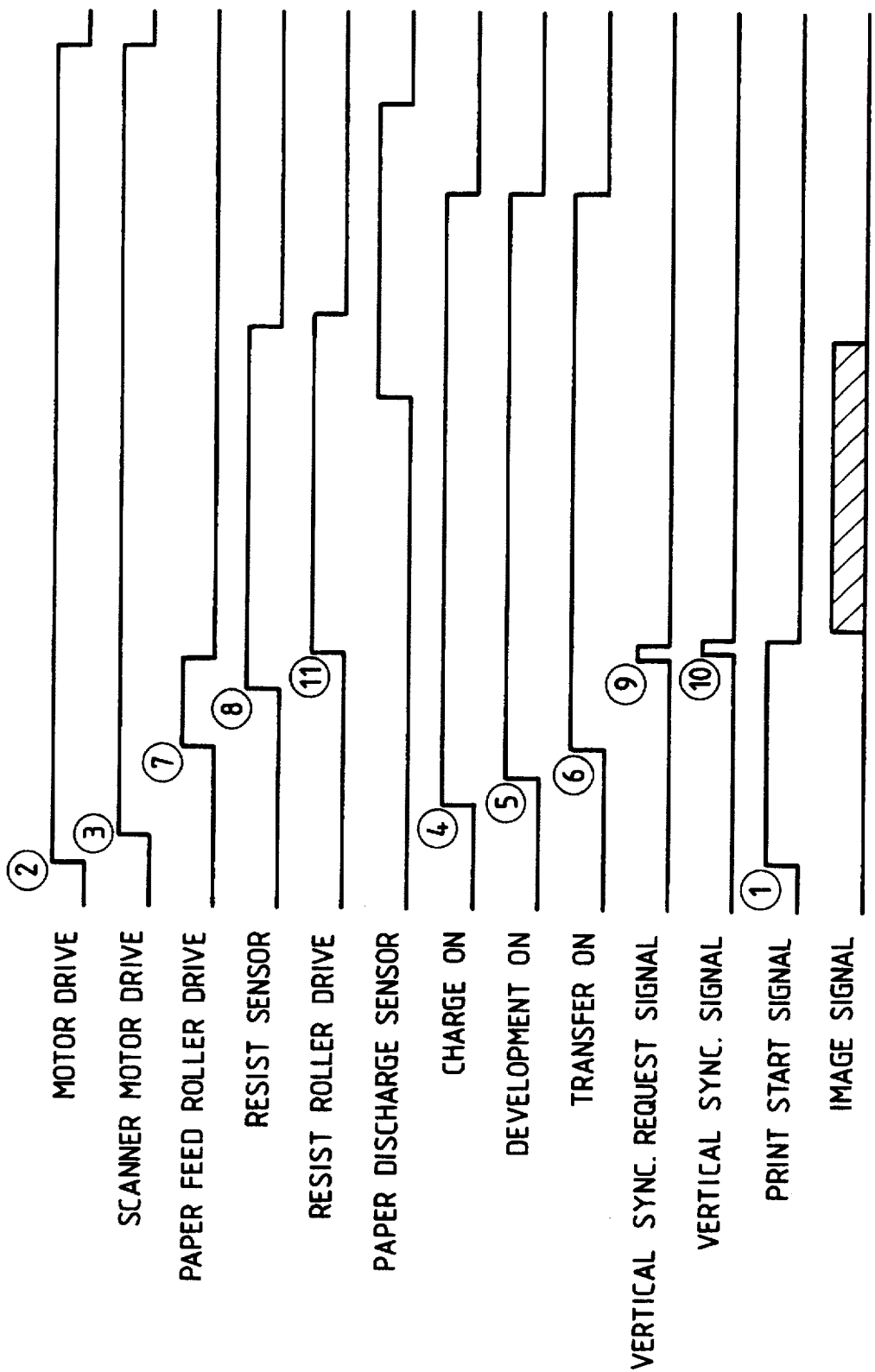
FIG. 6 is a timing chart showing the operation of the prior art.

Further while performing sequential drive of the high voltage systems around the drum in parallel (step S11), the control unit judges whether or not paper has reached the resist sensor 110 (step S12). After the resist sensor 110 has detected paper, the control unit sets a timer to $T_3$ (sec) in step S13. After the time for the timer is up (step S14), the control unit instructs to stop the paper feed rollers 107 and 108 (step S15), and outputs a vertical synchronous request signal to the printer controller 128 (step S16). It then waits for the vertical synchronous signal from the printer controller 128 (step S17), and starts writing an image on the sensitizing drum on receipt of it (step S18). Thereafter, the same process as the above-mentioned conventional example (FIG. 6) will be performed.

FIG. 16 shows a timing chart for the above sequence.

$T_1$ (sec) in FIG. 16 shows the $T_1$ (sec) described in the flow chart in FIG. 15. According to this figure, the driving time for the sensitizing drum 100 is shortened by $T_0$ (sec) as compared with the conventional example.

[Sixth Embodiment]

Figure 17:
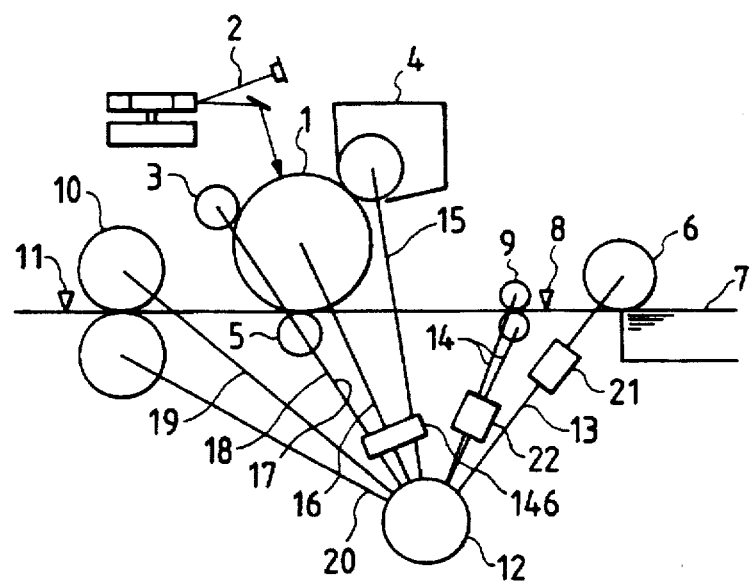
FIG. 17 shows a configuration of the fifth embodiment according to the present invention.
Figure 18:
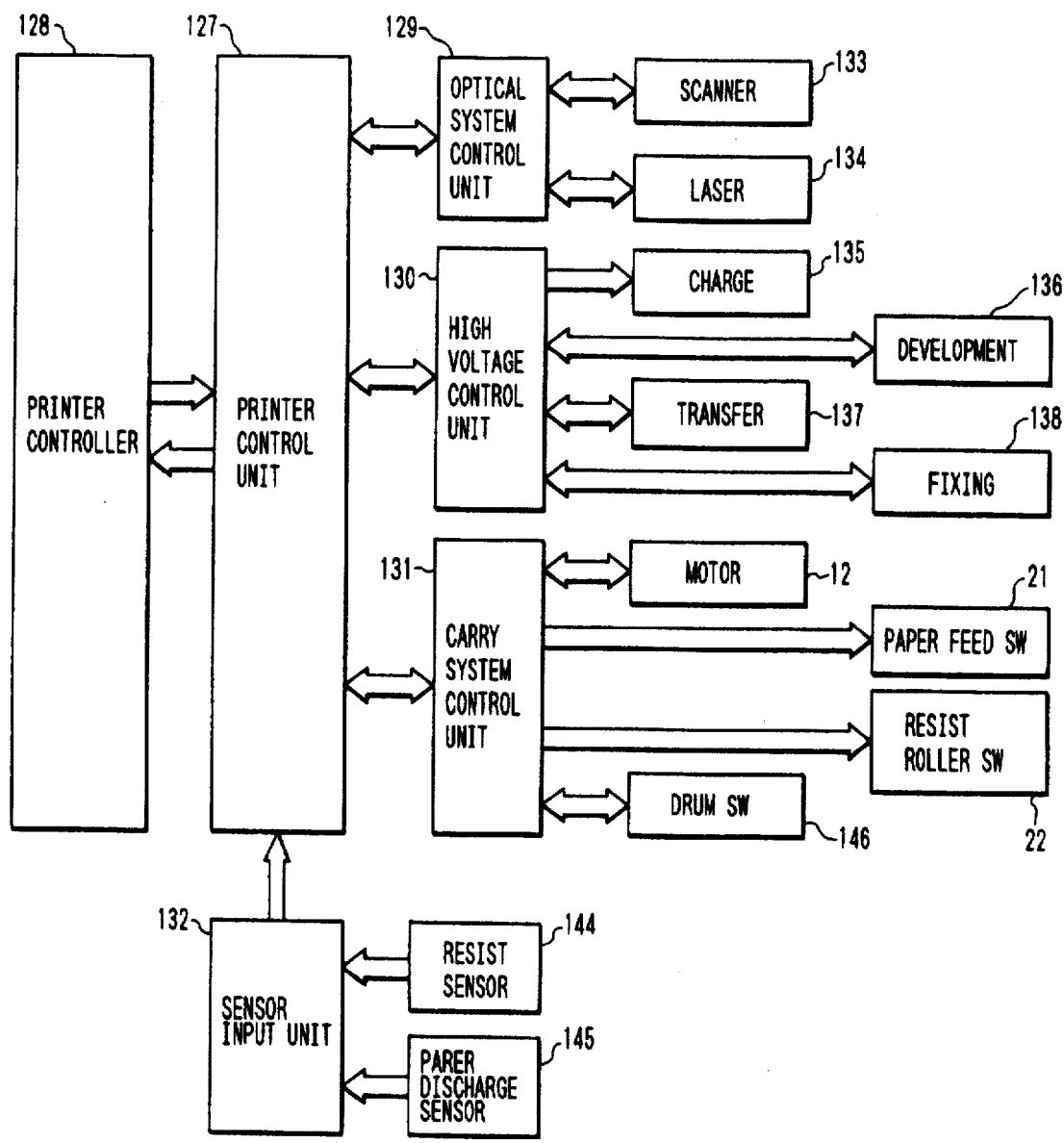
FIG. 18 is a block diagram showing an electric configuration of the fifth embodiment.

FIGS. 17 and 18 show the second embodiment according to the present invention. This is different from the conventional example in the configuration in that a switch mechanism 146 for cutting off/transmitting a driving transmission system which transmits the drive of a motor 12 to the sensitizing drum and the charge roller system around it, and a control system for the switch mechanism have been provided.

Quite the same operation as the above-mentioned embodiment can be performed by adopting a configuration, in which the drum can be driven and stopped independently of the feed paper system even if only a motor is thus used. In other words, the drive of the first motor in the above-mentioned embodiment may be only replaced with ON of the drum system switch.

Figure 19B:
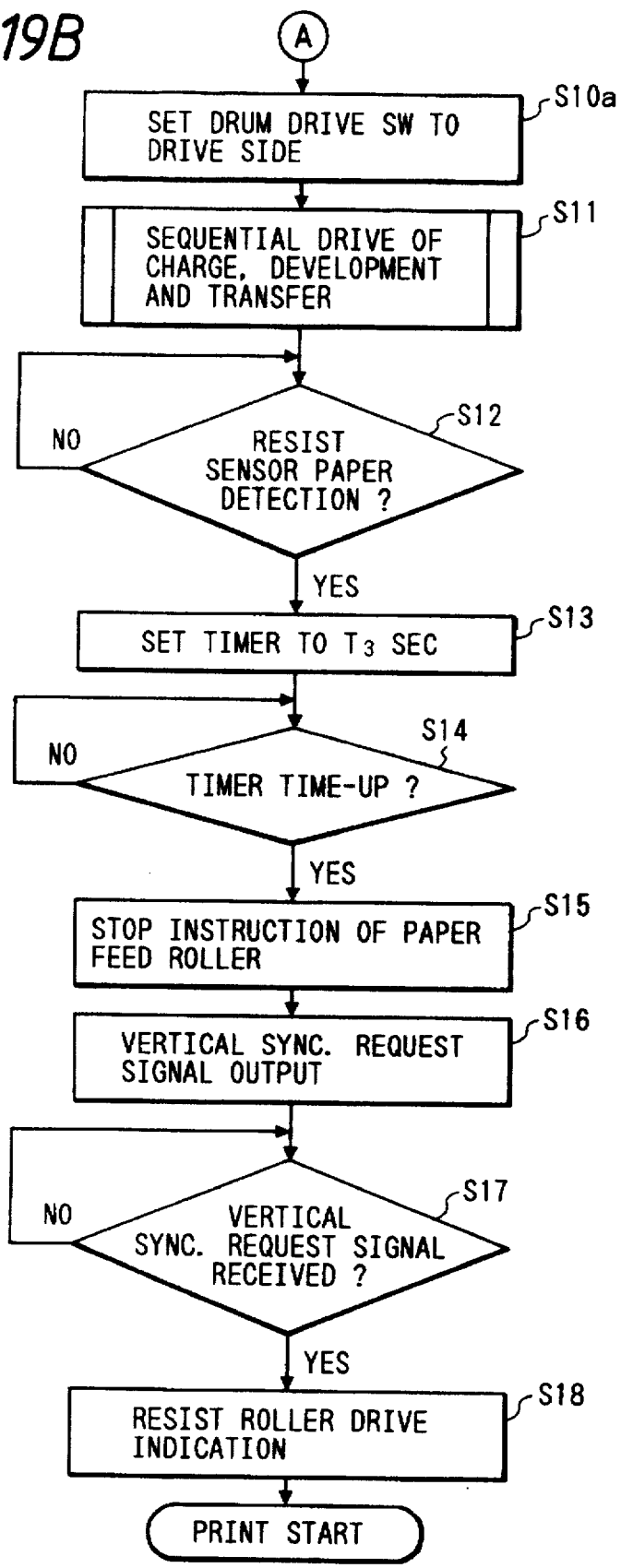
FIG. 19 is a flow chart of assistance in explaining the operation of the fifth embodiment.

FIG. 19 shows a flow chart. On receipt of a print signal, motor drive is started in step S2a, but at this point, the drum system drive swtich 146 is off, that is, the motor drive is not being transmitted. After the time of a timer $T_1$ (sec) is up, the switch 146 is turned on (step S10a) to start driving the drum system. FIG. 20 is a timing chart for these processes. To further extend the drum life, the drive of the drum system is stopped (point (A) in FIG. 20) after transfer on paper, and the drum system is not driven until paper discharge by the fix roller is completed.

[Seventh Embodiment]

Figure 21B:
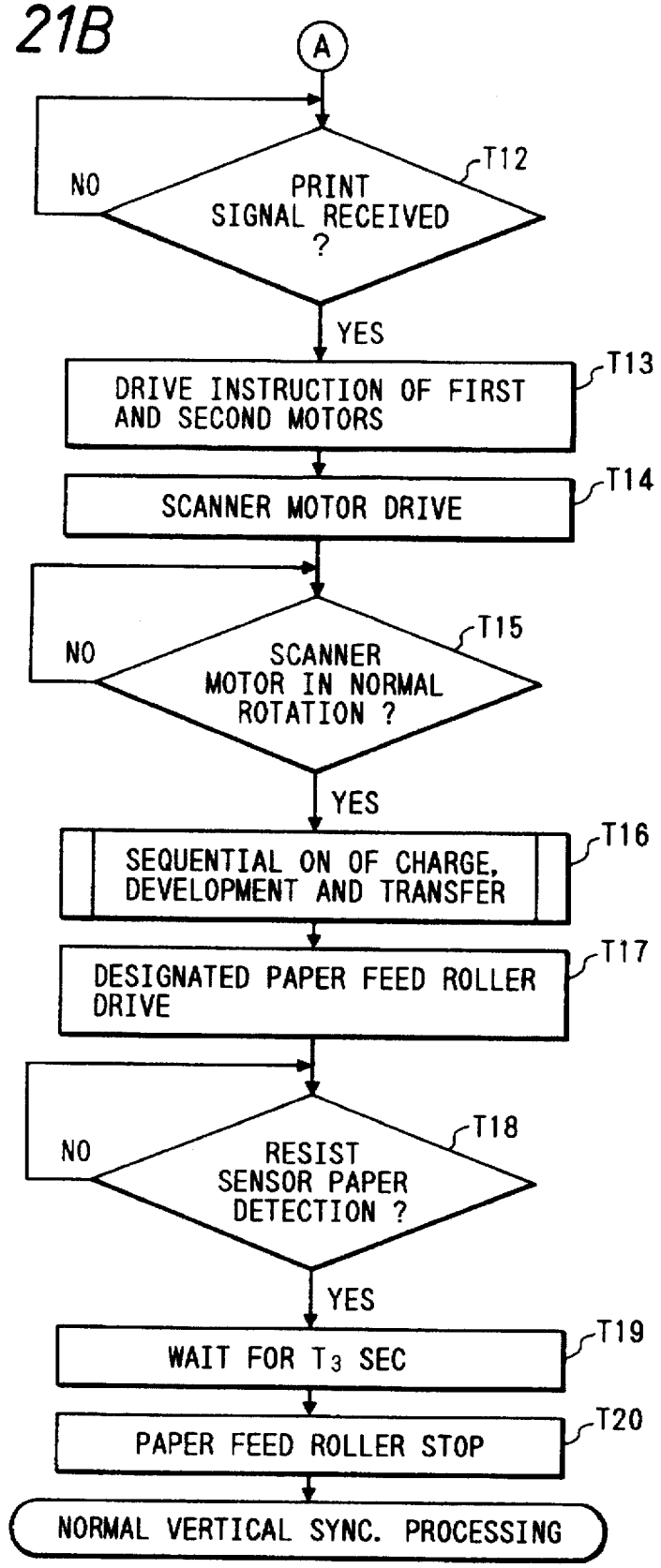
FIG. 21 is a flow chart of assistance in explaining the operation of the sixth embodiment according to the present invention.

FIG. 21 shows a sequence when the printer control unit 127 has received, from the printer controller 128, a spare paper feed signal, that is, such a signal that, unlike the print start signal, carries paper to a specified place, allows it to stand by at the position, and thereafter prints through a print start signal. For the configuration of the printer, any of the configurations shown in the first and second embodiments can be used, and the sequence is shown with the configuration shown in the first embodiment here.

In the embodiment according to the present invention, on receipt of a spare paper feed signal (steps T1, T2) before receiving the print start signal, the second motor is driven (step T3) without driving the scanner motor to feed paper (steps T5 to T9) in the same manner as the above-mentioned operation. Hereafter, are stopped the paper feed and the second motor (steps T10, T11), and flow idles while waiting for a print signal (step T12). On receipt of the print signal, the first and second motors are driven and the scanner motor (steps T13, T14), and when the scanner motor reaches a normal number of revolutions (step T15), are high voltage sequences are performed in order (step T16).

Hereafter, the paper feed roller is again driven (step T17), and then the same operation as in the above-mentioned embodiment is performed (steps T18 to T20).

Since it is not necessary to uselessly drive the sensitizing drum 100 when thus feeding spare paper, the effect of extending the drum life can be obtained like the above-mentioned embodiment.

In the above embodiments 1 to 4, the print start signal is output by synchronizing with the completed pixel conversion, and the scanner motor is ensured to be driven when the print start signal is received (when starting to drive the sensitizing drum). In the embodiments 5 and 6, the scanner motor is driven through the print start signal, and the drive of the sensitizing drum has been started after a lapse of a specified time from the reception of the print start signal. However, both may be optionally combined.

The above embodiments are only examples of applications of the present invention. The present invention can be applied by modifying in various ways within the scope of the Claims, and those are all within the scope of the present invention.

We claim:

1. An image forming apparatus comprising:
    image forming means for forming an image onto a rotatable image carrier in accordance with pixel data input to the image forming means from a data source; and
    feeding means for feeding a sheet, onto which the image formed on the rotatable image carrier is to be transferred, from holding means which holds a plurality of sheets, in response to a predetermined signal output from said data source,
    wherein the predetermined signal is output from the data source prior to output of a print signal from the data source to begin a printing operation and is receivable both when the rotatable image carrier is rotating and when it is not rotating, and wherein in a case that the predetermined signal is received when the rotatable image carrier is not rotating, said image forming apparatus starts rotation of the rotatable image carrier in response to the print signal from said data source after feeding of the sheet is started in response to the predetermined signal.

2. An image forming apparatus according to claim 1, wherein said data source comprises input means for inputting code information from an external apparatus, and converting means for converting the input code information into the pixel data.

3. An image forming apparatus according to claim 2, wherein the feeding means is capable of feeding a next sheet even if conversion of code information for a subsequent page has not been completed.

4. An image forming apparatus according to claim 1, wherein said image forming means comprises light-beam generating means for generating a light beam modulated on a basis of the pixel data and light-beam deflecting means including a rotatable polygonal mirror for scanning the rotatable image carrier with the light beam generated by the light-beam generating means, and wherein when the predetermined signal is output while said rotatable polygonal mirror is not rotating, a rotation of said rotatable polygonal mirror is started in response to the output predetermined signal.

5. An image forming apparatus according to claim 4, wherein said feeding means stops a sheet fed at a predetermined upstream position of said image forming means.

6. An image forming apparatus according to claim 5, further comprising determining means for determining whether a subsequent page of the pixel data has been generated.

7. An image forming apparatus according to claim 6, wherein said determining means makes its determination of whether a subsequent page of the pixel data has been generated on the basis of the print signal.

8. An image forming apparatus according to claim 7, wherein said light-beam deflecting means operates at low speed while said image forming apparatus waits for the print signal to be output.

9. An image forming apparatus according to claim 6, wherein said light beam deflecting operation is stopped for a predetermined time when the sheet is stopped at a predetermined position and said determining means determines that the subsequent page of the pixel data has not been generated.

10. An image forming apparatus according to claim 9, wherein said light-beam deflecting operation is started when said determining means determines that the pixel data has been generated when said light-beam deflecting operation is not being performed.

11. An image forming apparatus comprising:

a data source which generates a predetermined signal before image data to be printed is ready, and which generates a print signal when the image data to be printed has been ready;

image forming means for forming an image onto a rotatable image carrier in accordance with the pixel data from the source; and feeding means for feeding a sheet, onto which the image formed on the rotatable image carrier is to be transferred, from holding means which holds a plurality of sheets, in response to the predetermined signal, wherein said data source generates the predetermined signal prior to the print signal from the data source to begin a printing operation, wherein the predetermined signal is receivable both when the rotatable image carrier is rotating and when it is not rotating, and wherein in a case that the predetermined signal is received when the rotatable image carrier is not rotating, said image forming means starts rotation of the rotatable image carrier in response to the print signal from said data source after feeding of the sheet is started in response to the predetermined signal.

12. An image forming apparatus according to claim 11, wherein said data source comprises input means for inputting code information from an external apparatus and converting means for converting the input code information into the pixel data.

13. An image forming apparatus according to claim 12, wherein the feeding means is capable of feeding a next sheet even if conversion of code information for a subsequent page has not been completed.

14. An image forming apparatus according to claim 11, wherein said image forming means comprises light-beam generating means for generating a light beam modulated on a basis of the pixel data and light-beam deflecting means including a rotatable polygonal mirror for scanning the rotatable image carrier with the light beam generated by the light-beam generating means, and wherein when the predetermined signal is output while said rotatable polygonal mirror is not rotating a rotation of said rotatable polygonal mirror is started in response to the output predetermined signal.

15. An image forming apparatus according to claim 14, wherein said feeding means stops a sheet fed at a predetermined upstream position of said image forming means.

16. An image forming apparatus according to claim 15, further comprising determining means for determining whether a subsequent page of the pixel data has been generated.

17. An image forming apparatus according to claim 16, wherein said determining means makes its determination of whether a subsequent page of the pixel data has been generated on the basis of the print signal.

18. An image forming apparatus according to claim 17, wherein said light beam deflecting means operates at low speed while said image forming apparatus waits for the print signal to be output.

19. An image forming apparatus according to claim 16, wherein said light beam deflecting operation is stopped for a predetermined time when the sheet is stopped at a predetermined position and said determining means determines that the subsequent page of the pixel data has not been generated.

20. An image forming apparatus according to claim 19, wherein said light beam deflecting operation is started when said determining means determines that the pixel data has been generated when said light beam deflecting operation is not being performed.

* * * * *